US010372774B2

(12) United States Patent
Gupta et al.

(10) Patent No.: US 10,372,774 B2
(45) Date of Patent: Aug. 6, 2019

(54) ANTICIPATORY CONTEXTUAL NOTIFICATIONS

(71) Applicant: Microsoft Technology Licensing, LLC, Redmond, WA (US)

(72) Inventors: Akhilesh Gupta, Sunnyvale, CA (US); Ya-Tsun Yang, Redwood City, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 561 days.

(21) Appl. No.: 14/552,196

(22) Filed: Nov. 24, 2014

(65) Prior Publication Data

US 2016/0065630 A1 Mar. 3, 2016

Related U.S. Application Data

(60) Provisional application No. 62/044,112, filed on Aug. 29, 2014.

(51) Int. Cl.
| | | |
|---|---|---|
| *G06F 16/955* | (2019.01) | |
| *G06Q 50/00* | (2012.01) | |
| *H04L 29/08* | (2006.01) | |
| *G06Q 10/10* | (2012.01) | |

(52) U.S. Cl.
CPC .......... *G06F 16/955* (2019.01); *G06Q 10/10* (2013.01); *G06Q 50/01* (2013.01); *H04L 67/12* (2013.01)

(58) Field of Classification Search
CPC ... H04L 29/06; H04L 67/12; G06F 17/30867; G06F 17/3053; G06F 17/30598; G06F 17/30395; G06F 17/30876; G06Q 50/01; G06Q 30/02; G06Q 30/0207
See application file for complete search history.

(56) References Cited

U.S. PATENT DOCUMENTS

| | | | | |
|---|---|---|---|---|
| 2002/0161757 | A1* | 10/2002 | Mock | G06F 17/30386 |
| 2012/0166452 | A1* | 6/2012 | Tseng | G06F 17/30867 |
| | | | | 707/749 |
| 2013/0060623 | A1* | 3/2013 | Walker | G06Q 30/0259 |
| | | | | 705/14.27 |
| 2013/0185654 | A1* | 7/2013 | Harris | H04W 4/206 |
| | | | | 715/753 |
| 2015/0262435 | A1* | 9/2015 | Delong | G07C 5/0816 |
| | | | | 340/439 |

* cited by examiner

*Primary Examiner* — Nicholas McFall
*Assistant Examiner* — Terri L Filosi
(74) *Attorney, Agent, or Firm* — Schwegman Lundberg & Woessner, P.A.

(57) ABSTRACT

A system and method for anticipatory contextual notifications are provided. In example embodiments, a context indication corresponding to a user that is a member of a social network service is received. The context indication is indicative of a real-time context of the user. The context indication is analyzed to determine that the context indication is a significant context indication. An entity associated with the significant context indication and that is a member of the social network service is identified. Member data associated with the identified entity and the user is accessed. Notification context is generated based, at least in part, on an analysis of the significant context indication and the member data. Presentation, to the user, of a notification that includes the notification context is caused.

13 Claims, 16 Drawing Sheets

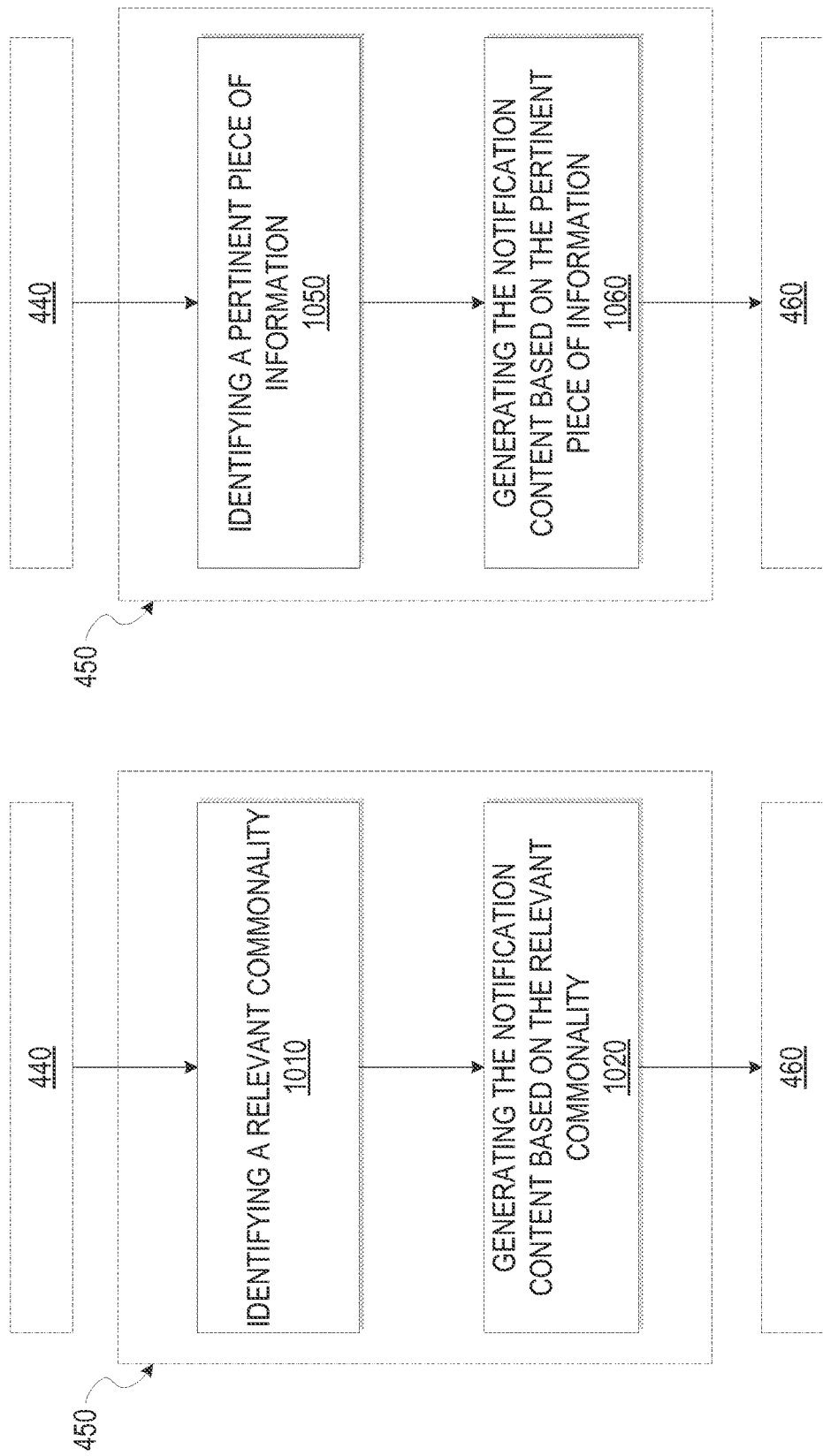

ANTICIPATORY CONTEXTUAL
NOTIFICATIONS

RELATED APPLICATIONS

This application claims the priority benefit of U.S. Provisional Application No. 62/044,112, entitled "ANTICIPATORY CONTEXTUAL NOTIFICATIONS," filed Aug. 29, 2014, which is hereby incorporated by reference in its entirety.

TECHNICAL FIELD

Embodiments of the present disclosure relate generally to computer technology and, more particularly, but not by way of limitation, to anticipatory contextual notifications.

BACKGROUND

In recent years, mobile devices, wearable devices, smart devices, and the like have pervaded nearly every aspect of modern life. In addition, the near ubiquity of wireless networks provides users with access to information and services provided by the Internet at virtually any physical location. For example, users of social network services, such as LINKEDIN®, may access social networking information via mobile devices.

BRIEF DESCRIPTION OF THE DRAWINGS

Various ones of the appended drawings merely illustrate example embodiments of the present disclosure and should not be considered as limiting its scope.

FIGS. 10A and 10B are flow diagrams illustrating further example operations for identifying an entity associated with a context indication, according to some example embodiments.

Figure 1:
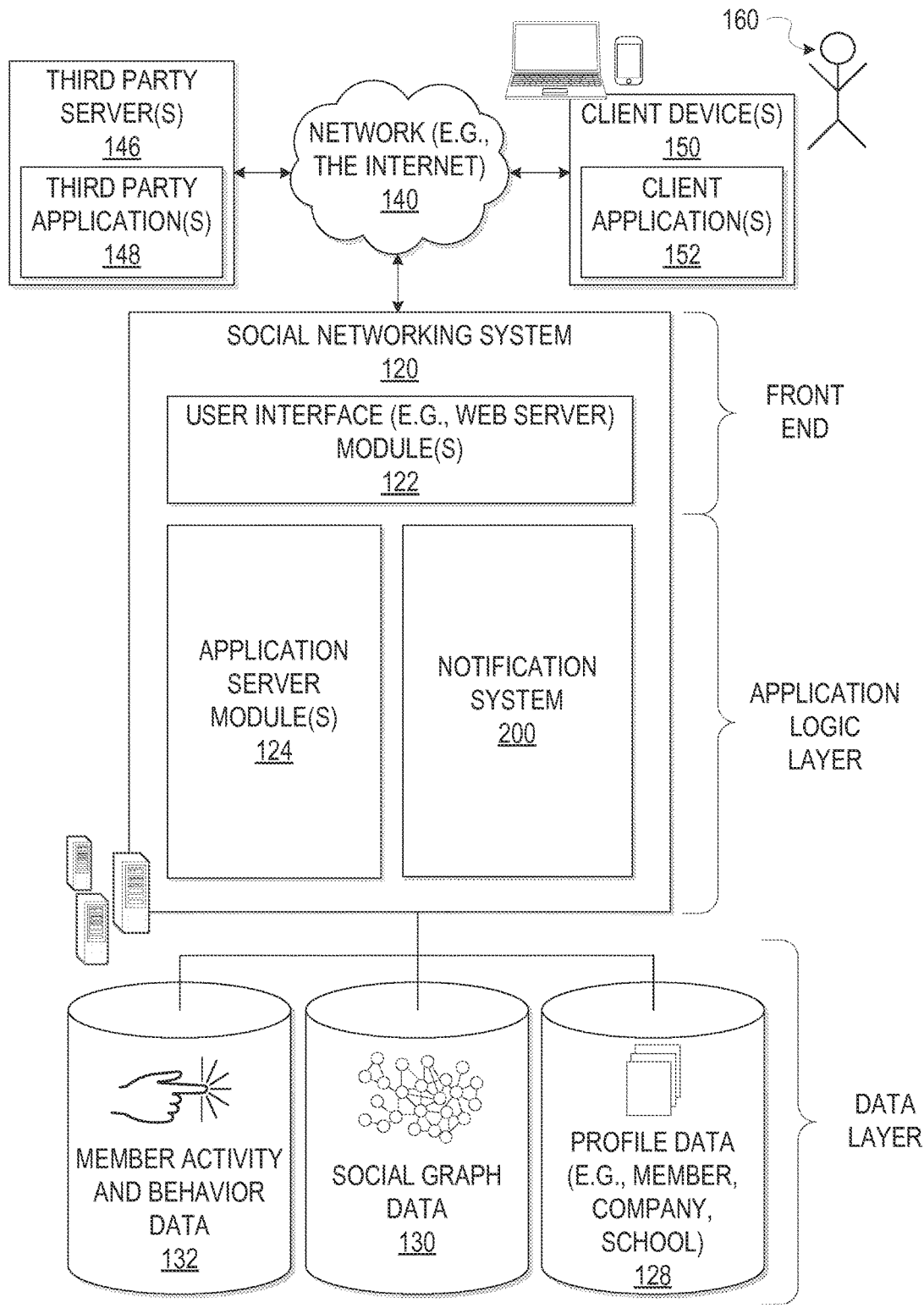
FIG. 1 is a network diagram depicting a client-server system within which various example embodiments may be deployed.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter can be practiced without these specific details. In general, well-known instruction instances, protocols, structures, and techniques are not necessarily shown in detail.

In various example embodiments, systems and methods for anticipatory contextual notifications are described. In an embodiment, a context indication corresponding to a user that is a member of a social network service is received. The context indication is indicative of a real-time context of the user, according to some embodiments. In various embodiments, the context indication includes or indicates context data such as temporal data (e.g., scheduling data such as calendar data of the user retrieved from a user device), proximity data (e.g., nearby entities such as other members of the social network service within a radius of the user), location data (e.g., a current or past user location as determined by a Global Positioning System (GPS) component of a mobile device), other environmental or context data, or any suitable combination thereof. For example, the user can trigger the context indication by scheduling a new calendar event to the user's calendar, moving or staying within a distance of a particular geographic location (e.g., the user attending a meeting at a particular building as determined by a GPS component of a mobile device of the user), or being proximate to another user (e.g., as determined via BLUETOOTH® or WI-FI® signals exchanged between a device of the user and a device of another user).

Subsequent to receiving the context indication, the context indication is analyzed to determine that the context indication is a significant context indication. For example, a significance score is calculated and when the significance score exceeds a threshold, the context indication is determined to be a significant context indication. A wide variety of significance factors and analyses can be employed to calculate the significance score.

In a specific example, the context indication includes location data that indicates the user is at a particular location. In this particular example, the context indication is a significant context indication if the user is at the particular location for the first time as determined based on an analysis of historical locations of the user. In contrast, if the user frequently visits the particular location, the context indication is not a significant context indication since the user routinely visits the particular location as determined based on an analysis of historical locations of the user.

In various embodiments, an entity, associated with the significant context indication, that is a member of the social network service is identified. For example, the significant context indication corresponds to or indicates a calendar event of the user. In this example, the identified entity comprises a participant or attendee of the calendar event as determined by accessing calendar data corresponding to the calendar event. In another example, the context indication indicates or corresponds to proximity data of the user. In various embodiments, the proximity data indicates entities within a radius or distance of the user (e.g., as determined via a BLUETOOTH® signal detected from a device of the particular entity). For instance, if the user is attending a particular meeting with several other calendar event participants, a device of the user detects signals from devices of the other calendar event participants. In still another example, the context indication includes the location data. The entity is identified based on a geographic location query for a particular location indication by the location data. For instance, the user may be attending a meeting at a particular building and the geographic coordinates of the building are queried to identify an entity associated with the particular building.

In various implementations, member data associated with the identified entity and the user is accessed. For instance, member data of the user and the identified entity is accessed from the social network service (e.g., a professional social network service such as LINKEDIN®). The member data comprises profile data, social graph data, member activity and behavior data, and other data.

Subsequent to accessing the member data, notification content is generated based, at least in part, on an analysis of the significant context indication and the member data, according to some implementations. The notification content includes a wide variety of information that can be relevant to the significant context indication. For example, if the significant context indication indicates the user is scheduled to attend a meeting, the notification content includes information associated with participants or attendees of the meeting (e.g., profile information of the participants or attendees). A wide variety of schemes and techniques can be employed to generate the notification content such that it is relevant or pertinent to the significant context indication. Once the notification content has been generated, a notification, including the notification content, is presented, or caused to be presented, to the user (e.g., a push notification or text message). In some instances, various presentation parameters are determined (e.g., presentation time, presentation device, or presentation alertness level) and the notification is presented according to the presentation parameters.

As shown in FIG. 1, a social networking system 120 is generally based on a three-tiered architecture, consisting of a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. However, a skilled artisan will readily recognize that various additional functional modules and engines can be used with a social networking system, such as that illustrated in FIG. 1, to facilitate additional functionality that is not specifically described herein. Furthermore, the various functional modules and engines depicted in FIG. 1 can reside on a single server computer, or can be distributed across several server computers in various arrangements. Moreover, although depicted in FIG. 1 as a three-tiered architecture, the inventive subject matter is by no means limited to such an architecture.

As shown in FIG. 1, the front end layer consists of a user interface module(s) (e.g., a web server) 122, which receives requests from various client-computing devices including one or more client device(s) 150, and communicates appropriate responses to the requesting device. For example, the user interface module(s) 122 receives requests in the form of Hypertext Transport Protocol (HTTP) requests, or other web-based, Application Programming Interface (API) requests. The client device(s) 150 may be executing conventional web browser applications or applications (also referred to as "apps") that have been developed for a specific platform to include any of a wide variety of mobile computing devices or wearable computing device and mobile-specific operating systems (e.g., IOS™, ANDROID™, WINDOWS® PHONE). For example, client device(s) 150 may be executing client application(s) 152. The client application(s) 152 can provide functionality to present information to the user and communicate via a network 140 to exchange information with the social networking system 120. In various implementations, each of the client device(s) 150 can comprise a computing device that includes at least a display and communication capabilities with the network 140 to access the social networking system 120. The client device(s) 150 can comprise, but are not limited to, remote devices, work stations, computers, general purpose computers, Internet appliances, hand-held devices, wireless devices, portable devices, wearable computers, cellular or mobile phones, personal digital assistants (PDAs), smart phones, smart watches, smart glasses, tablets, ultrabooks, netbooks, laptops, desktops, multi-processor systems, microprocessor-based or programmable consumer electronics, game consoles, set-top boxes, network personal computers (PCs), mini-computers, and the like. One or more users 160 can be a person, a machine, or other means of interacting with the client device(s) 150. The user(s) 160 can interact with the social networking system 120 via the client device(s) 150. The user(s) 160 may not be part of the networked environment, but may be associated with client device(s) 150.

As shown in FIG. 1, the data layer includes several databases, including a database 128 for storing data for various entities of the social graph, including member profiles, company profiles, educational institution profiles, and information concerning various online or offline groups. Of course, with various alternative embodiments, any number of other entities might be included in the social graph, and as such, various other databases can be used to store data corresponding with other entities.

Consistent with some embodiments, when a person initially registers to become a member of the social networking service, the person will be prompted to provide some personal information, such as his or her name, age (e.g., birth date), gender, interests, contact information, home town, address, the names of the member's spouse and/or family members, educational background (e.g., schools, majors, etc.), current job title, job description, industry, employment history, skills, professional organizations, interests, and so on. In another example, a company, business, organization, or the like can register at the social network service and provide information such as name, location, branding information, and so forth. This information is stored, for example, as profile data in the database 128.

Once registered, a member can invite other members, or be invited by other members, to connect via the social networking service. A "connection" can specify a bi-lateral agreement by the members, such that both members acknowledge the establishment of the connection. Similarly, with some embodiments, a member can elect to "follow" another member. In contrast to establishing a connection, the concept of "following" another member typically is a unilateral operation, and at least with some embodiments, does not require acknowledgement or approval by the member being followed. When one member connects with or follows another member, the member who is connected to or following the other member can receive messages or updates (e.g., content items) in his or her personalized content stream about various activities undertaken by the other member. More specifically, the messages or updates presented in the content stream can be authored and/or published or shared by the other member, or can be automatically generated based on some activity or event involving the other member. In addition to following another member, a member can elect to follow a company, a topic, a conversation, a web page, or some other entity or object, which may or may not be included in the social graph maintained by the social networking system. With some embodiments, because the content selection algorithm selects content relating to or associated with the particular entities that a member is connected with or is following, as a member connects with and/or follows other entities, the universe of available content items for presentation to the member in his or her content stream increases.

As members interact with various applications, content, and user interfaces of the social networking system 120, information relating to the member's activity and behavior can be stored in a database, such as the database 132.

The social networking system 120 can provide a broad range of other applications and services that allow members the opportunity to share and receive information, often customized to the interests of the member. For example, with some embodiments, the social networking system 120 can include a photo sharing application that allows members to upload and share photos with other members. With some embodiments, members of the social networking system 120 can be able to self-organize into groups, or interest groups, organized around a subject matter or topic of interest. With some embodiments, members can subscribe to or join groups affiliated with one or more companies. For instance, with some embodiments, members of the social network service can indicate an affiliation with a company at which they are employed, such that news and events pertaining to the company are automatically communicated to the members in their personalized activity or content streams. With some embodiments, members are allowed to subscribe to receive information concerning companies other than the company with which they are employed. Membership in a group, a subscription, or following relationship with a company or group, as well as an employment relationship with a company, are all examples of different types of relationships that can exist between different entities, as defined by the social graph and modeled with social graph data of the database 130.

The application logic layer includes various application server module(s) 124, which, in conjunction with the user interface module(s) 122, generate various user interfaces with data retrieved from various data sources or data services in the data layer. With some embodiments, individual application server modules 124 are used to implement the functionality associated with various applications, services, and features of the social networking system 120. For instance, a messaging application, such as an email application, an instant messaging application, or some hybrid or variation of the two, can be implemented with one or more application server modules 124. A photo sharing application can be implemented with one or more application server modules 124. Similarly, a search engine enabling users to search for and browse member profiles can be implemented with one or more application server modules 124. Of course, other applications and services can be separately embodied in their own application server modules 124. As illustrated in FIG. 1, social networking system 120 can include a notification system 200, which is described in more detail below.

Additionally, a third party application(s) 148, executing on a third party server(s) 146, is shown as being communicatively coupled to the social networking system 120 and the client device(s) 150. The third party server(s) 146 can support one or more features or functions on a website hosted by the third party.

Figure 2:
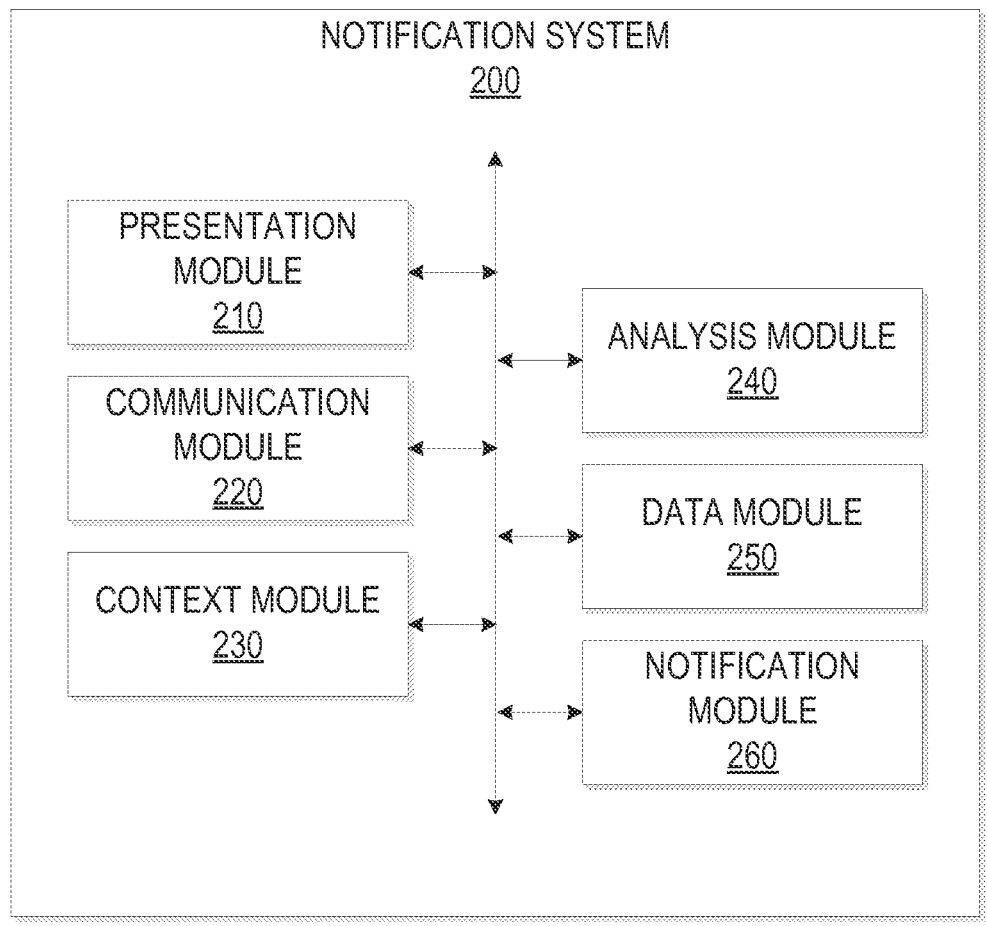
FIG. 2 is a block diagram illustrating an example embodiment of a notification system, according to some example embodiments.

FIG. 2 is a block diagram of the notification system 200 that provides functionality to generate anticipatory contextual notifications, according to some example embodiments. In an example embodiment, the notification system 200 includes a presentation module 210, a communication module 220, a context module 230, an analysis module 240, a data module 250, and a notification module 260. All, or some, of the modules 210-260 of FIG. 2, communicate with each other, for example, via a network coupling, shared memory, and the like. It will be appreciated that each module of modules 210-260 can be implemented as a single module, combined into other modules, or further subdivided into multiple modules. Other modules not pertinent to example embodiments can also be included, but are not shown.

In some implementations, the presentation module 210 provides various presentation and user interface functionality operable to interactively present and receive information from the user. For instance, the presentation module 210 can cause presentation of various notifications or user interfaces that provide the user with pertinent or relevant information associated with the significant context indication. In various implementations, the presentation module 210 presents or causes presentation of information (e.g., visually displaying information on a screen, acoustic output, haptic feedback). Interactively presenting information is intended to include the exchange of information between a particular device and the user. The user can provide input to interact with the user interface in many possible manners such as alphanumeric, point based (e.g., cursor), tactile, or other input (e.g., touch screen, tactile sensor, light sensor, infrared sensor, biometric sensor, microphone, gyroscope, accelerometer, or other sensors), and the like. It will be appreciated that the presentation module 210 provides many other user interfaces to facilitate functionality described herein. Further, it will be appreciated that "presenting" as used herein is intended to include communicating information or instructions to a particular device that is operable to perform presentation based on the communicated information or instructions.

The communication module 220 provides various communication functionality and web services. For example, the communication module 220 provides network communication such as communicating with the networked system 102, the client device 110, and the third party server(s) 146. In various example embodiments, the network communication operates over wired or wireless modalities. Web services are intended to include retrieving information from the third party server(s) 146, the databases 128, 130, or 132, and the client device(s) 150. In some implementations, information retrieved by the communication module 220 comprises data associated with the user (e.g., user profile information from an online account, social network service data associated with the user), or other data to facilitate the functionality described herein.

The context module 230 provides functionality to receive, retrieve, access, or otherwise obtain the context indication. In various implementations, the context indication is indicative of a real-time context of the user. For instance, the context indication includes or indicates context data corresponding to the user such as the proximity data, the location data, the temporal data, or any combination thereof. For example, the context indication indicates proximity data such as entities being within a radius of the user in real-time, location data such as a real-time user location, temporal data such as real-time changes or updates to user data such as the calendar data, or other updates or changes to user data. In some instances, the context indication is indicative of a future event (e.g., the user scheduling a particular calendar event corresponding to a future time) that will be a real-time context of the user in the future. The term "real-time data," as used herein, is intended to include data associated with an event currently happening. For example, the real-time data includes user input data or sensor data communicated to the context module 230 after a delay interval (e.g., due to transmission delay or other delays such as being temporarily stored at an intermediate device) between capturing the data and the context module 230 receiving the data.

In various implementations, the context module 230 determines whether the context indication is a significant context indication. For example, the context indication, received at the context module 230, can be a calendar update provided by the user (e.g., the user added a new calendar event to a calendar application on a mobile device), detecting a particular entity that is within a radius of the user (e.g., via BLUETOOTH® communication), detecting the user is physically at a particular location (e.g., via a GPS component of a user device), and so on.

The analysis module 240 performs a wide variety of analyses to facilitate the functionality described herein. For instance, the analysis module 240 identifies entities associated with the significant context indication. In other instances, the analysis module 240 conditions or otherwise prepares various data for analysis. In a specific instance, the analysis module 240 standardizes entity names to facilitate identifying the entity as a member of the social network service.

Standardization (also referred to as canonicalization), as used herein, is intended to include generating and/or determining a standardized form of a piece of information. For instance, a particular piece of information may be similar or intended to be similar to another piece of information. In this instance, standardizing the information results in generating a standard form (also referred to as normal form) that reduces a variety of similar representations of the information to a standardized form. For a specific example, various pieces of information is referring to a single street name (e.g., "market street." "Market st.," or "Market ST"). Standardizing the street name results in standardized form (e.g., "Market St.") that represents multiple similar forms. Standardizing various pieces of information provides for direct comparisons between standardized forms of the pieces of information and allow for more accurate mathematical analysis because similar information or information that is intended to be similar can be grouped together. It will be appreciated that standardization can be performed using a variety of schemes and techniques.

The data module 250 provides functionality to access data from many different sources including member data stored in databases 128, 130, and 132, the third party server(s) 146, and other sources. The member data includes, for example, social graph data, profile data, and member activity and behavior data, as described in connection with FIG. 1. For example, the data module 250 accesses member data (e.g., member data stored in databases 128, 130, and 132) associated with a particular member of the social network service by a lookup or a search of the particular member using a member identifier. In another example, the data module 250 retrieves information corresponding to a particular geographic location from the third party server(s) 146. For instance, the data module 250 identifies an entity name associated with particular latitude and longitude via a lookup in a geographic information database hosted on the third party server(s) 146. In some instances, the geographic information database is hosted locally on the application server module(s) 124.

The notification module 260 provides functionality to generate the notification content and one or more notifications that include the notification content. The notification content can be personalized to the user and relevant to the context indication. The notification module 260 employs a variety of schemes and techniques to generate the notification content. For instance, the notification module 260 identifies a plurality of content items and rank, sort, or score the plurality of content items based on pertinence or relevance to the user or the context indication. In this instance, the notification module 260 generates the notification content to include higher-ranking or higher-scoring content items (e.g., content items that are more relevant or pertinent to the user than other content items). In various implementations, the notification content includes text, images, links, other executable content, and so forth.

In some instances, the notification is interactive in that the user provides input that causes a particular action (e.g., activating a user interface element included in the notification to form a connection or relationship between a particular entity and the user on the social network server). In example embodiments, the notification comprises a text message, such as Short Message Service (SMS) messages, Multimedia Messaging Service (MMS), Enhanced Messaging Service (EMS), or a suitable combination thereof. In other example embodiments, the notification comprises a push notification or another similar type of notification. In some example embodiments, the notification is an in-app notification such as a notification provided via a third-party application running on a mobile device (e.g., a social network service app running on a smart phone of the user).

Figure 3:
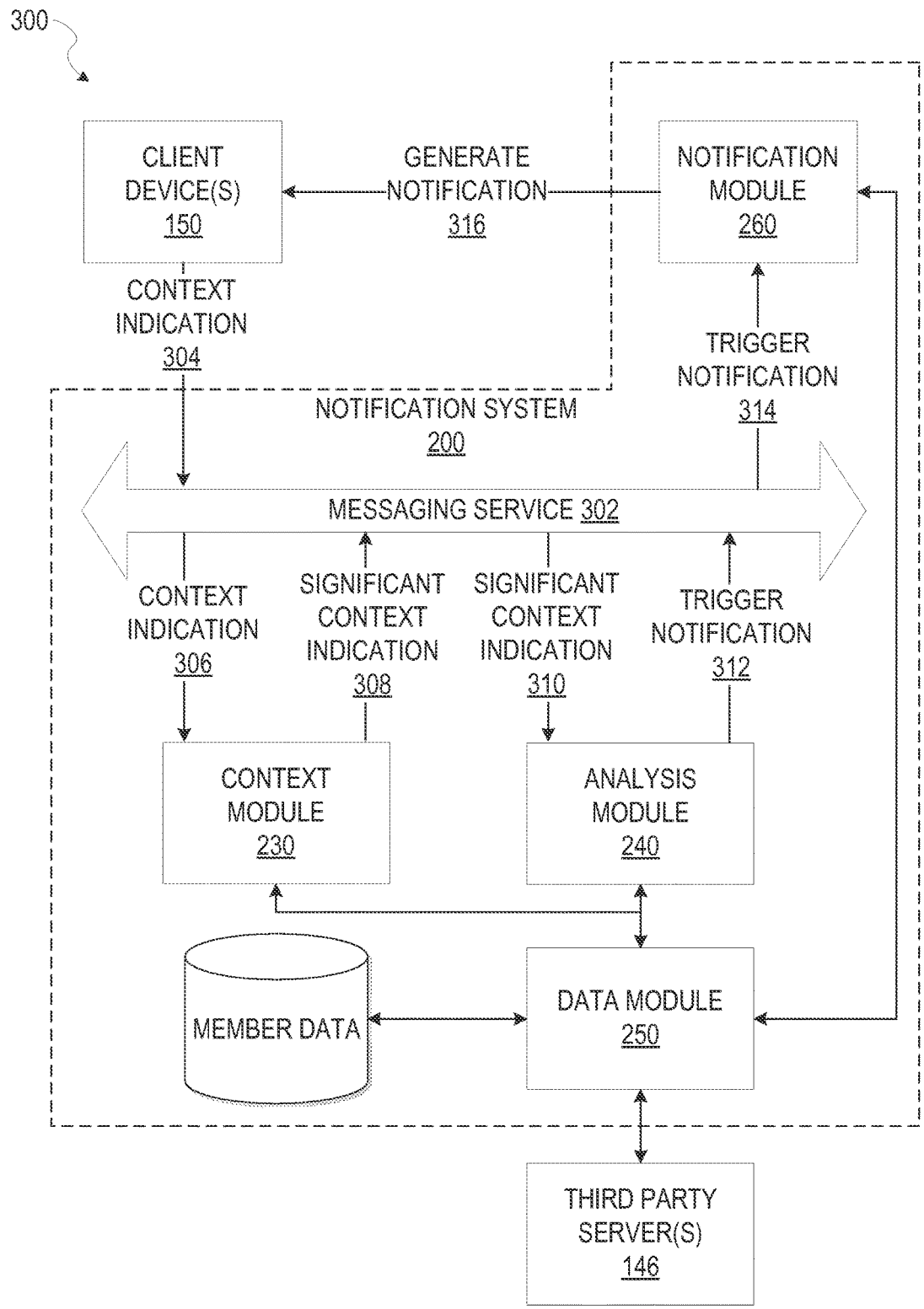
FIG. 3 is a block diagram illustrating an example implementation of the notification system of FIG. 2, according to some example embodiments.

FIG. 3 is a block diagram 300 illustrating an example implementation of the notification system 200. In an example embodiment, the communication module 220 facilitates or implements the functionality of a messaging service 302. The messaging service 302 provides communication between various components of the notification system 200 and the client device(s) 150. In the example of FIG. 3, the messaging service 302 may be in the form of a publish/subscribe (also referred to as consumer/producer) messaging service (e.g., Apache Kafka). For instance, a particular module or device publishes messages to the messaging service 302 and another module or device listens to or consumes the published messages. In this way, data is communicated or exchange between various devices or modules. The messaging service 302 acts as a message broker to decouple processing between various modules, according to some implementations. In alternative embodiments, other messaging schemes are implemented to facilitate the functionality described herein.

In the block diagram 300, the client device(s) 150 (e.g., a mobile device of the user) triggers, generates, or otherwise causes the context indication. For example, if the user modifies the user data, such as the calendar data, at the client device(s) 150, the change to the user data generates the context indication. In another example, if the client device(s) 150 provides user location updates, each user location update generates the context indication. In still another example, if the client device(s) 150 detects a particular entity within a radius of the client device(s) 150 (e.g., a mobile device of another member of the social network service detected via a BLUETOOTH® signal being broadcast from the mobile device), the client device(s) 150 generates the context indication. The context indication is communicated to messaging service 302 from the client device(s) 150, as shown by communication 304, and subsequently received at the context module 230, as shown by communication 306. For instance, changes to the user calendar data are published to the messaging service 302, and the context module 230 listens to or consumes the calendar change publications.

In various implementations, the context module 230 analyzes the context indication to determine that the context indication is a significant context indication. For example, the context module 230 receives a large volume of context indications from the messaging service 302. To avoid overloading the user with notifications, the context module 230 can skip, omit, or otherwise ignore some of the context indications. The context module 230 employs a variety of schemes and techniques to determine that a particular context indication is a significant context indication. In some instances, the context module 230 employs member data or data from the third party server(s) 146, accessed via the data module 250, to determine that the context indication is significant. In a specific example, if the user modifies the user data such as the calendar data to include a new calendar event, the context module 230 employs a heuristic scheme to determine whether the new calendar event is significant. For instance, if the new calendar event is associated with a particular member of the social network service to whom the user has a strong connection (e.g., frequently messages the particular member on the social network service), the context module 230 determines that the context indication is a significant context indication (see FIG. 8 below for additional discussion regarding the context module 230 determining a significant context indication).

Once the context module 230 determines that the context indication is a significant context indication, the context module 230 publishes the significant context indication to the messaging service 302, as shown by communication 308. The analysis module 240 listens for and receives the significant context indication from the messaging service 302, as shown by communication 310. The analysis module 240 identifies one or more entities associated with the significant context indication. In some instances, the analysis module 240 accesses various data, via the data module 250, to determine entities associated with the significant context indication. For instance, if the significant context indication corresponds to a particular calendar event, the analysis module 240 identifies entities associated with the particular calendar event such as attendees or participants of the particular calendar event.

After the analysis module 240 identifies the entity, the analysis module 240 triggers, generates, or otherwise causes a notification, as shown by communication 312. The notification module 260 listens for and receives the triggered notification from the messaging service 302, as shown by communication 314. The notification module 260 then generates notification content and generates a notification including the notification content. For instance, the notification content includes various content items associated with the identified entity, the user, or a combination of both. For example, a particular content item can be a relevant commonality between the user and the identified entity (e.g., both the user and the identified entity went to the same school). The notification module 260 generates the notification that is communicated to the client device(s) 150, as shown by communication 316. In some implementations, the notification is communicated using the messaging service 302 while in other implementations, the notification is communicated to the client device(s) 150 without the messaging service 302 (e.g., an SMS message). In some implementations, the presentation module 210 causes the presentation of the notification to the user. For instance, the presentation module 210 generates the user interface corresponding to the notification to be presented to the user. In some instances, the presentation module 210 communicates or transmits the user interface with instructions to present the user interface including the notification to the user.

Figure 4:
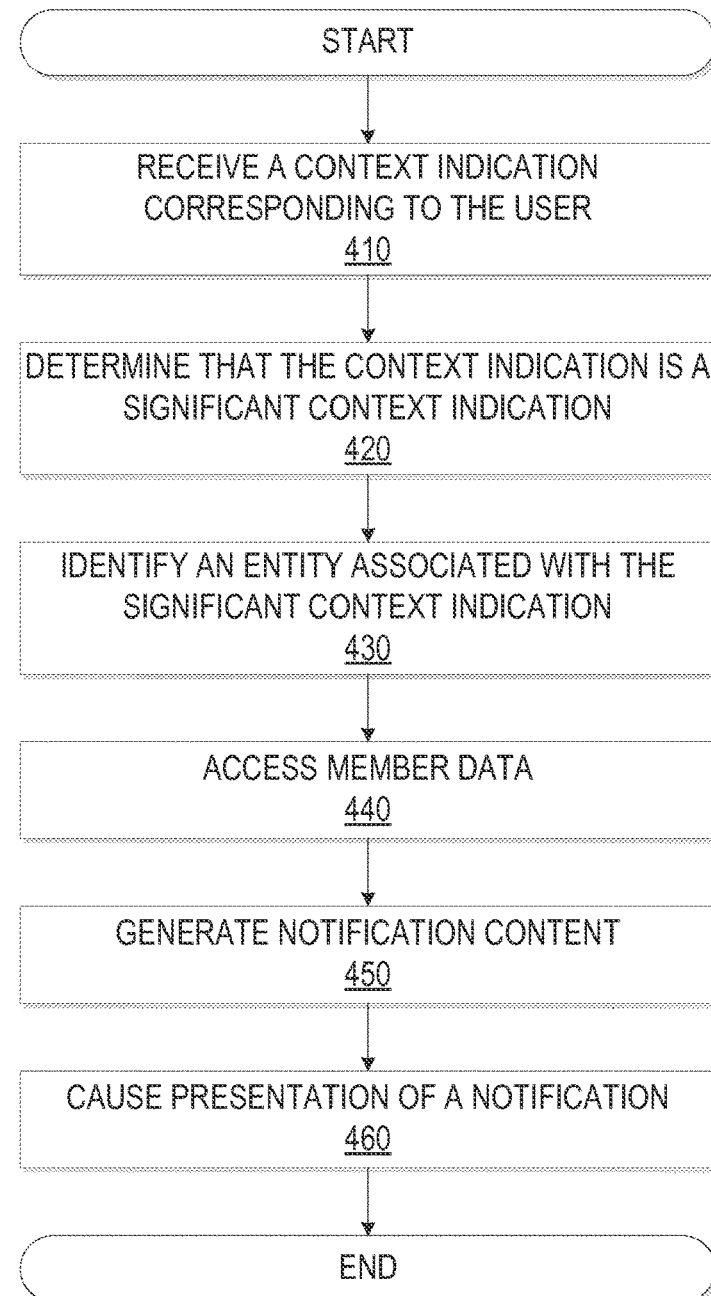
FIG. 4 is a flow diagram illustrating an example method for generating a notification, according to some example embodiments.

Referring now to FIG. 4, a flow diagram is shown illustrating an example method 400 for generating the notification, according to some example embodiments. At operation 410, the context module 230 receives the context indication corresponding to the user. The user is registered at or is a member of the social network service. The context indication can be indicative of the real-time context or the environment of the user.

In various embodiments, the context indication includes or indicates context data such as temporal data (e.g., scheduling data such as calendar data of the user retrieved from a user device), proximity data (e.g., nearby entities such as other members of the social network service within a radius of the user), location data (e.g., a current or past user location as determined by a GPS component of a mobile device), other environmental or context data, or any suitable combination thereof. In various implementations, the context indication is generated, triggered, or otherwise caused in response to changes or modifications to various data such as the context data.

In an example, the context indication is triggered in response to the location data of the user (e.g., periodic updates of the user location received from a mobile device of the user). In this example, the context indication includes the location data of the user. The location data can include a current location of the user as determined by a variety of sensors of a user device. The user device can include location sensors (e.g., a GPS receiver component), altitude sensors (e.g., altimeters or barometers that detect air pressure from which altitude can be derived), orientation sensors (e.g., magnetometers that provide magnetic field strength along the x, y, and z axes), and the like. In an example embodiment, the sensors of the user device provide position data such as latitude, longitude, altitude, and a time stamp. The user device periodically (the period can be configurable) provides location updates corresponding to the current location of the user. Other location services can be employed to determine the current user location such as location via Internet Protocol (IP) geo-location, location via WI-FI® signal triangulation, location via detecting a Near Field Communication (NFC) beacon signal that can indicate a particular location, and so forth.

In another example, the context indication is triggered in response to the user updating the user data such as temporal data (e.g., adding or modifying a calendar event included in the calendar data). In this example, the user maintains, curates, or otherwise manages the temporal data such as calendar data using, for example, a calendar application running on a mobile device. In some instances, the user updates the calendar data that is stored on a particular server using a mobile device, and the data module 250 accesses the calendar data of the user from the particular server storing the calendar data. In some implementations, each change or modification to the calendar data of the user generates a new context indication associated with the user and the modified calendar data.

In another example, the context indication is triggered in response to the proximity data of the user. The proximity data indicates entities within a vicinity of the user. For example, the context module 230 detects entities (such as other members of the social network service) within a radius (e.g., three meters) of the user. The radius can be predefined, dynamically determined, or configurable by the user or an operator. In a specific example, the radius is simply the communication range of a particular short-range communication technique. For instance, the context module 230 detects entities within BLUETOOTH® range of the user, which is typically several meters. In some implementations, the context indication includes the proximity data such as the user member identifier corresponding to the user and an entity member identifier corresponding to the entity that is within the radius of the user.

At operation 420, the context module 230 determines that the context indication is a significant context indication. In some example embodiments, numerous context indications are received by the context module 230. In these example embodiments, generating a notification for each context indication may burden the user with a large number of notifications. To reduce the number of notifications, the context module 230 identifies significant context indications that can be the basis for a notification presented to the user. As further discussed in connection with FIG. 8, the context module 230 calculates the significance score, according to some embodiments. In an embodiment, the context module 230 determines that a particular context indication is significant if the significance score exceeds a threshold.

At operation 430, the analysis module 240 identifies an entity associated with the significant context indication. It will be appreciated that the entities are intended to include businesses, organizations, people, and the like. For instance, the entity is a particular person that is a member of the social network service. In another instance, the entity is a particular location such as a local airport. In still another instance, the entity is a particular business.

The analysis module 240 identifies the entity associated with the significant context indication in a variety of ways. In some instances, the significant context indication includes an entity member identifier that corresponds to the entity (e.g., the significant context indication includes the proximity data that indicates entities, via the entity member identifier, within a radius of the user). The entity member identifier can be a member identifier that identifies a particular member of the social network service, for instance. In a specific instance, if the significant context indication corresponds to a particular calendar event, the analysis module 240 accesses the calendar data for the particular calendar event to identify one or more entities that are participants or attendees of the calendar event (further discussed in connection with FIG. 9A, below). In yet another example, if the significant context indication includes location data, the analysis module 240 queries a geographic database to identify an entity associated with a particular location indicated by the location data (e.g., lookup of an entity associated with a longitude and latitude further discussed in connection with FIG. 9B, below). The analysis module 240 can employ many other techniques to identify the entity associated with the significant context indication.

At operation 440, the data module 250 accesses member data associated with the identified entity and the user. For example, the data module 250 performs a lookup of the entity on the social network service based on the entity member identifier associated with the entity. Similarly, the data module 250 can perform a lookup of the user based on the member identifier corresponding to the user.

At operation 450, the notification module 260 generates the notification content based, at least in part, on an analysis of the significant context indication and the member data. For instance, the notification module 260 identifies a plurality of content items and rank or sort the plurality of content items based on pertinence or relevance to the user or the context indication. In this instance, the notification module 260 generates the notification content to include higher-ranking content items (e.g., content items that are more relevant or pertinent to the user than other content items).

In some embodiments, the analysis module 240 identifies a relevant commonality between the user and the identified entity based on an analysis of the member data and the significant context indication, with the relevant commonality being relevant to the significant context indication (discussed further in connection with FIG. 10A, below). In another embodiment, the analysis module 240 identifies a pertinent piece of information based on an analysis of the member data and the significant context indication, with the pertinent piece of information being pertinent to the significant context indication (discussed further in connection with FIG. 10B, below).

In some example embodiments, the notification module 260 generates the notification content based on the user device on which the notification can be presented. For instance, if the user device is a wearable device, an abbreviated or otherwise shortened or abridged notification content is generated to accommodate the smaller display of the wearable device.

At operation 460, the presentation module 210 causes presentation of the notification that includes the notification content to the user. For example, the presentation module 210 generates a user interface that includes the notification and causes presentation of the user interface to the user. In other implementations, the presentation module 210 communicates or transmits the notification or the user interface including the notification to the client device(s) 150 with instructions to present the notification to the user.

In some embodiments, the presentation module 210 or the notification module 260 determines presentation parameters for the notification and cause presentation of the notification according to the presentation parameters. For example, the presentation parameters include a presentation time (e.g., a time in the future or a trigger that will cause presentation of the notification such as a particular status of the user being determined), a presentation device, an alertness level (e.g., a louder or otherwise more conspicuous alert sound for a particular notification), and so on. In some instances, the presentation module 210 determines the presentation time to be a time in the future.

In an embodiment, the presentation module 210 or the notification module 210 determines a particular user device to present the notification on from among a plurality of user devices. For instance, if the notification module 260 determines that the user is carrying a mobile device and is wearing a wearable device, the notification module 260 may determine to present the notification on the wearable device if the notification corresponds to a higher significance score. That is to say, the presentation module 210 causes presentation of the notification to the wearable device for more important or pertinent notifications.

For example, if the presentation module 210 determines that the user is sleeping (e.g., as determine based on an analysis of heart rate data of the user received from a wearable device the user is wearing), the presentation module 210 determines the presentation time to be a next time the user is awake (e.g., as determine via a schedule of the user or via heart rate sensor data). Thus, in some instances, a user status may trigger the presentation of the notification (e.g., the presentation module 210 determining the user is awake or the next time the user is idle or standing still based on GPS data, accelerometer data in conjunction with scheduling data of the user).

In further examples, the presentation module 210 or the notification module 260 queues notifications (as will be discussed below in connection with FIG. 5 and operation 514 scheduling pre-event tasks) to be presented to the user and cause presentation of the queued notifications at a suitable time (e.g., a time when the notification is pertinent to the user such as prior to a particular meeting associated with the notification).

Figure 5:
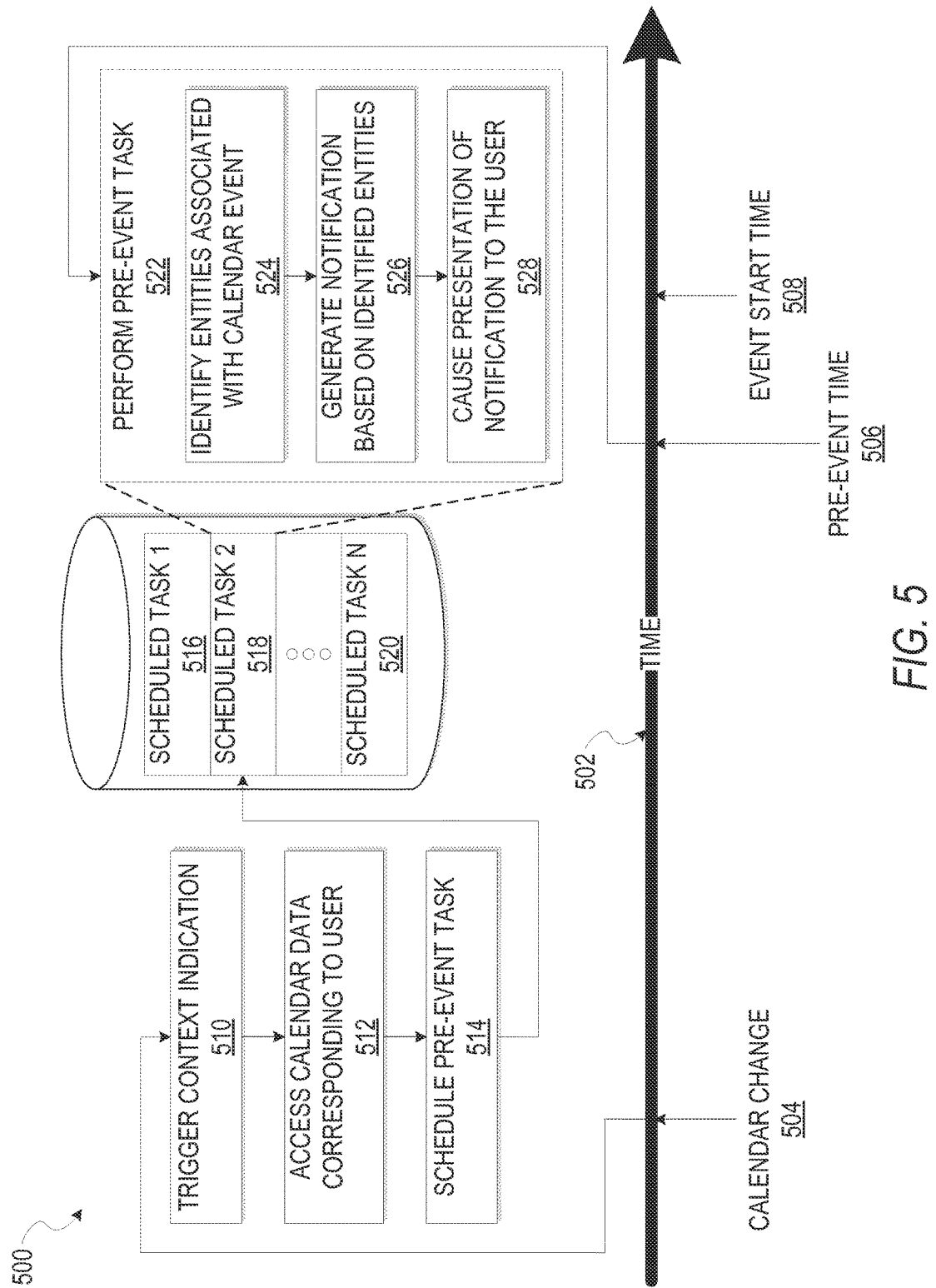
FIG. 5 is a diagram illustrating an example of temporal data based context indication, according to some example embodiments.

FIG. 5 is a diagram 500 illustrating an example of a user data update such as a calendar change 504 triggering, generating, or otherwise causing the context indication, according to some example embodiments. Time line 502 depicts certain occurrences happening sequentially in time. In this example, the calendar change 504 occurs first. In various embodiments, the calendar change 504 pertains to a particular calendar event that occurs at event start time 508. The calendar change 504 is, for example, the user updating temporal data such as calendar data (e.g., inputting a new calendar event such as a meeting the user is attending in the future). At operation 510, the calendar change 504 triggers the context indication received at the context module 230 (e.g., a calendar management app running on a mobile device of the user sends a calendar change message to the context module 230 for each update to the calendar data).

At operation 512, the data module 250 accesses calendar data corresponding to the user in response to receiving the context notification. The context module 230 analyzes the complete itinerary of the user to determine whether the context indication is a significant context indication. For instance, if the user has scheduled a new calendar event, the new calendar event is compared to other calendar events of the user to determine whether the new calendar event is unusual or otherwise noteworthy (e.g., meeting a particular member of the social network service for the first time as determined based on an analysis of historical calendar events or other user data). Such unusual or noteworthy calendar events can be a basis for the context module 230 to determine that the context indication is a significant context indication and schedule a particular pre-event task to present the notification to the user prior to the calendar event. In this way, the notification system 200 is anticipating user interest in a particular notification prior to a future event.

At operation 514, the notification module 260 schedules a pre-event task such as tasks 516, 518, and 520, to be performed at a task time. The notification module 260 schedules a plurality of tasks in response to various context indications. The notification module 260 stores the plurality of tasks in a database such as a database hosted by the application server module(s) 124. In various implementations, the tasks, when performed or executed, generates the notification content and the notification including the notification content to be presented to the user. The pre-event task is a task scheduled to execute, or be performed, prior to a particular event associated with the user (e.g., a calendar event such as a meeting). For instance, if the user inputs a new calendar event (e.g., a meeting), the notification module 260 schedules a pre-event task to be performed fifteen minutes prior to the scheduled calendar event.

At the pre-event time 506, the notification module 260 performs the previously scheduled pre-event task at operation 522. In some implementations, the notification module 260 determines at the task time whether to cause presentation of the notification to the user. For instance, when the pre-event task was scheduled, the context module 230 may have determined that the context indication was a significant context indication. However, at the task time, the notification module 260 can perform additional analysis to determine whether the notification is to be presented to the user (e.g., the notification content of the notification may no longer be relevant or pertinent at the task time such as the user canceling the calendar event or not attending the calendar event). At operation 524, the analysis module 240 identifies entities associated with the calendar event (e.g., accessing calendar data that indicates the calendar event participants or attendees). At operation 526, the notification module 260 generates the notification content based on the identified entities (e.g., the notification content can include profile information corresponding to the identified entity).

At operation 528, the presentation module causes presentation of the notification to the user. For example, the notification is communicated to the client device(s) 150 and is presented to the user.

Although FIG. 5 is directed to anticipatory notifications associated with temporal data, the discussion of FIG. 5 can be applied equally to other types of user data or member data. For example, if the user forms a new connection with a particular member of the social network service, this change to the member data of the user schedules a task to be performed based on a temporal trigger or another type of trigger. For instance, the notification module 260 implements a proximity trigger where the notification is to be presented to the user based on detecting a particular entity within a radius of the user. In a specific instance, if the user forms a new relationship or connection with a particular member of the social network service, the notification module 260 schedules a task, that when executed or performed, generates the notification, which includes notification content pertaining to the particular member of the social network service, to be presented to the user when the user is within a radius of the particular member for the first time since the scheduling of the task (e.g., to assist the user in remembering the particular member's name or other information regarding the particular member).

Figure 6:
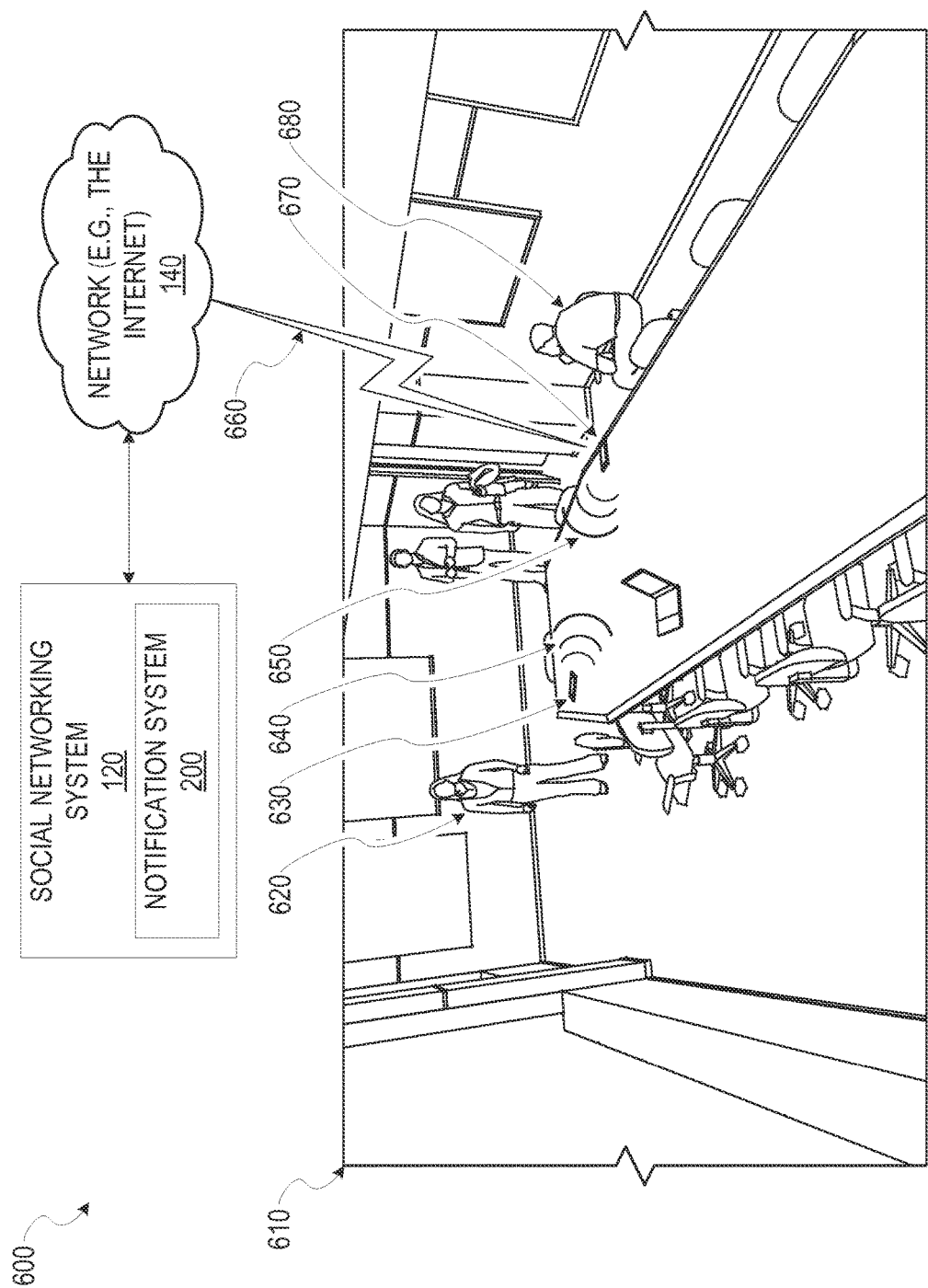
FIG. 6 is a diagram illustrating an example of proximity data based context indication, according to some example embodiments.

FIG. 6 is a depiction 600 illustrating an example of proximity data triggering, generating, or otherwise causing the context indication, according to some example embodiments. Scene 610 depicts a business meeting between several people. The scene 610 is merely a non-limiting example and the context indication can be triggered by proximity data in many other scenarios. In the scene 610, person 620 is attending the meeting and brought a device 630 (e.g., a smart phone) to the meeting. User 680 is also attending the meeting and brought user device 670 to the meeting. The device 630 and user device 670 includes components operable to detect, receive, or transmit a variety of communication signals. For example, the device 630 and the user device 670 can broadcast signals 640 and 650 respectively using a wireless communication technology such as BLUETOOTH® or WI-FI®. The device 630 and the user device 670 can also detect signals being broadcast. In various implementations, the user device 670 is communicatively coupled, via communication link 660, to the network 140, which is in turn communicatively coupled to the social networking system 120 that includes the notification system 200 (see the discussion above in connection with FIG. 1).

In the example of FIG. 6, the user device 670 detects the signal 640 being broadcast by the device 630 of the person 620 that is attending the meeting. In various implementations, the user device 670 detecting the signal 640 initiates or triggers the context indication received by the context module 230. The analysis module 240 identifies the entity corresponding to the signal. For example, the signal 640 comprises a BLUETOOTH® signal that indicates a member identifier corresponding to the person 620 (e.g., the BLUETOOTH® based signal being broadcasted includes the member identifier embedded into the BLUETOOTH® signal). In other implementations, the user analysis module 240 determines the identity of the person 620 via other communication modalities such as via WI-FI® (e.g., a WI-FI® based peer-to-peer multipath connection between the device 630 and the user device 670), NFC, and so forth.

Figure 7:
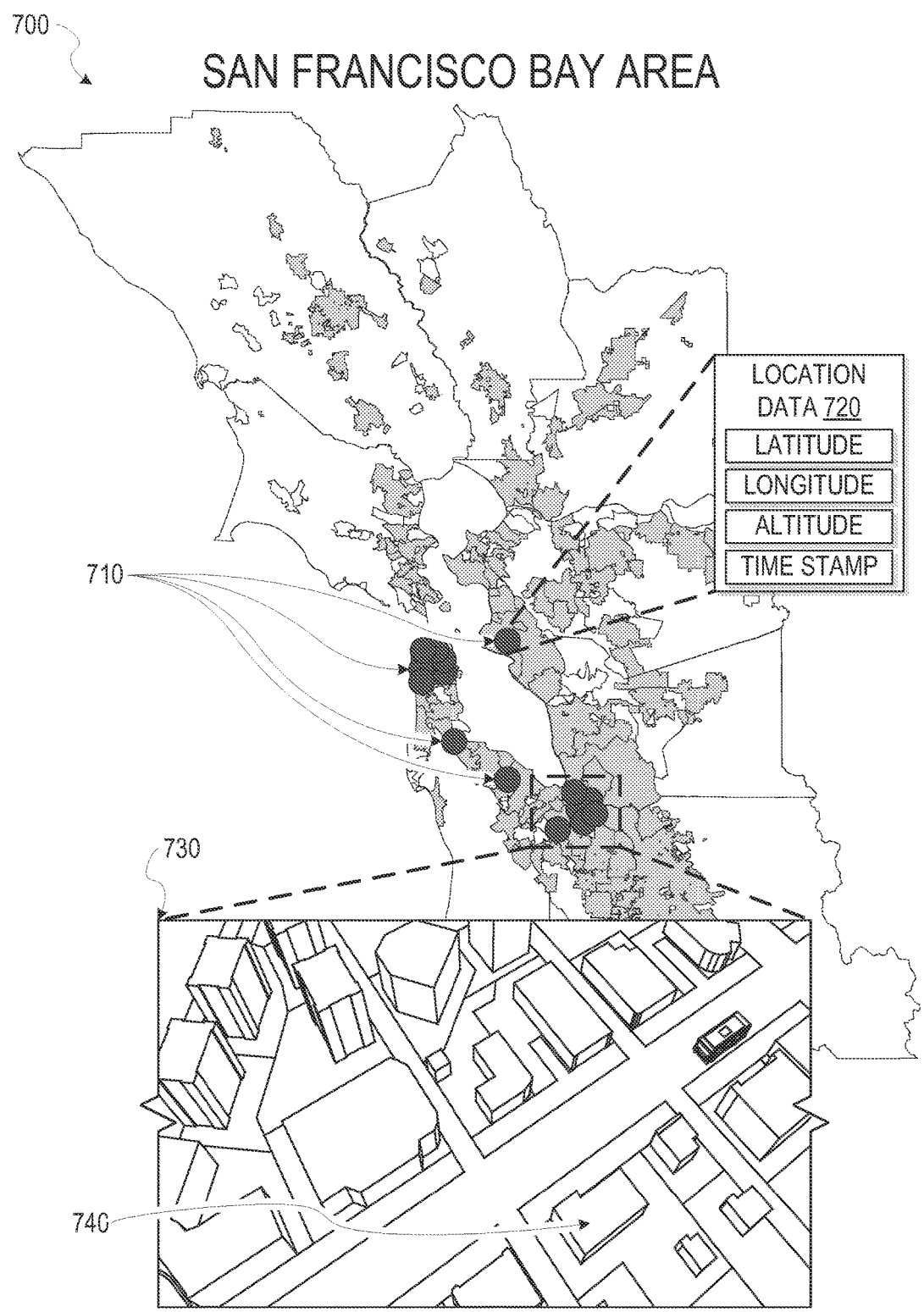
FIG. 7 is a diagram illustrating an example of location data based context indication, according to some example embodiments.

FIG. 7 is a diagram 700 illustrating an example of location data triggering, generating, or otherwise causing the context indication, according to some example embodiments. The diagram 700 shows a plurality of locations 710 that can be user locations as determined by a GPS component of a user device. In various implementations, the user device periodically communicates or streams location updates to the context module 230. In an alternative embodiment, the context module 230 periodically retrieves, requests, or accesses the location data corresponding to the user device. Each location can be associated with data such as location data 720. In an example, the location data 720 comprises latitude, longitude, altitude, a time stamp, and other data. Scene 730 depicts an enlarged portion of the diagram 700. In the scene 730, location 740 is a particular location relevant to the user. For instance, the location 740 is a building where the user works or lives.

As the data module 250 receives the location data from the user device, the location data can be analyzed or stored for subsequent analysis (e.g., stored in a database hosted by the application server module(s) 124). The analysis module 240 identifies a particular context indication associated with the location data as a significant context indication based on various analyses. For example, the analysis module 240 employs density clustering type analysis to identify "hot spots" or frequent locations the user visits. In addition, the analysis module 240 identifies the user's reasoning for going to a particular location using various schemes (e.g., where the user is located during normal working hours). The analysis module 240 can further identify significance of a particular location based on time spent at a particular location. For instance, if a user does not move outside of a radius (e.g., a predefined radius such as ten meters) of a particular location for a certain period of time, the analysis module 240 identifies the particular location as a location in which the user is performing some activity. Based on that inference, the analysis module 240 performs additional analysis associated with the particular location such as entity lookup for the particular location. The analysis module 240 can then infer a particular activity of the user based on the identified entity as determined by the geographic based lookup. The particular activity of the user can be the basis for the notification module 260 to generate notification content. Many other schemes and techniques can be employed to analyze the location data to determine the significant context indication and further to generate the notification content.

Figure 8:
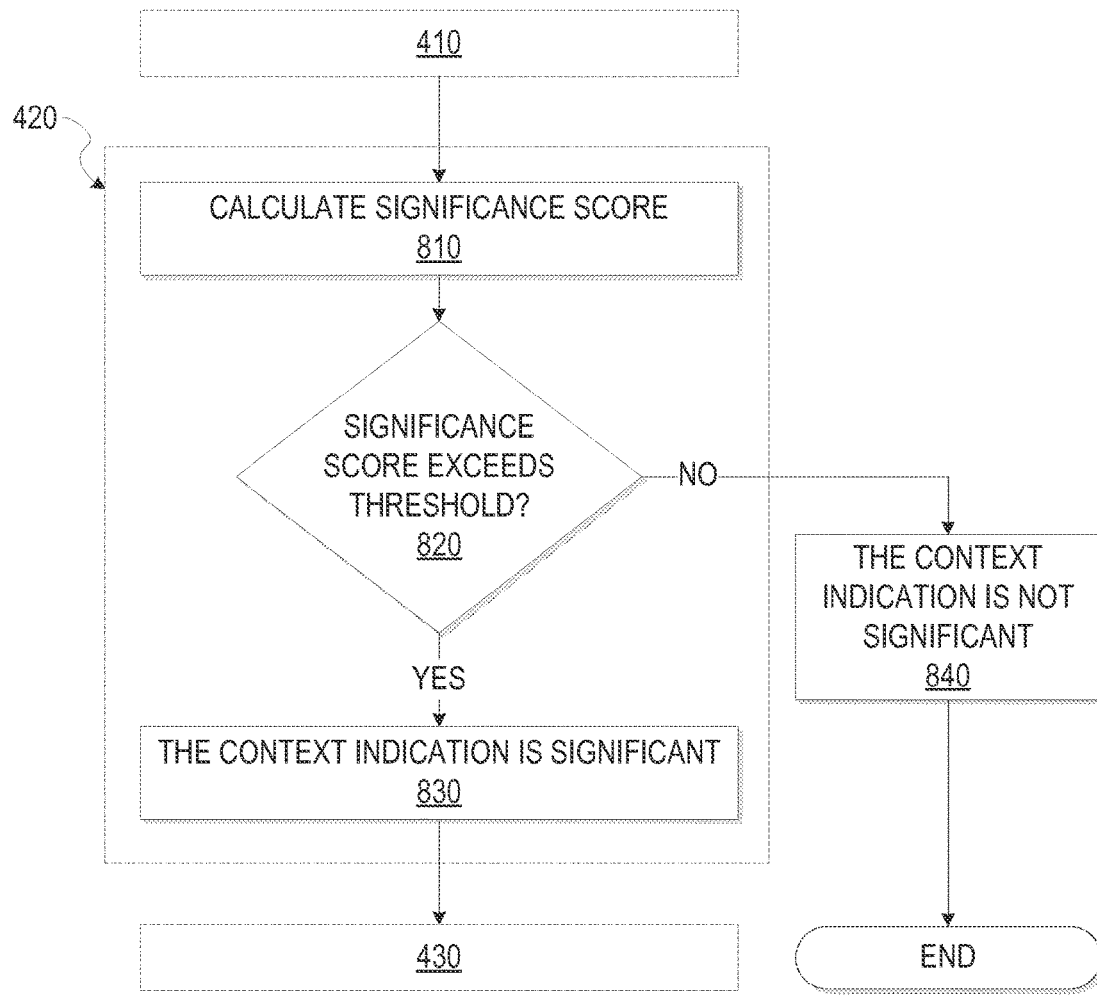
FIG. 8 is a flow diagram illustrating further example operations for determining a significant context indication, according to some example embodiments.

FIG. 8 is a flow diagram illustrating further example operations of the method 400 for generating the notification. Subsequent to the operation 410, at the operation 420, the context module 230 analyzes the context indication to determine whether the context indication is a significant context indication. In some implementations, the context module 230 performs the additional operations shown in FIG. 8. At operation 810, the context module 230 calculates the significance score for the context indication. A wide variety of significance factors and analyses can be employed when determining the significance score. In some implementations, the context module 230 determines that the context indication is significant based on historical behavior of the user. For instance, if in the past the user has dismissed or otherwise ignored particular notifications generated in response to a particular context indication, then context indications that are the same or similar to the particular context indication may not be associated with a high significance score. In another instance, if historical behavior data of the user (e.g., member activity and behavior data 132) indicates high user engagement (e.g., interacting with the notification, reading the notification) in connection with certain notifications generated in response to certain context indications, then context indications that are the same or similar to the certain context indications can be associated with a high significance score.

In some implementations, the context module 230 employs other heuristic analyses to calculate the significance score. For example, the context module 230 identifies user contacts (e.g., members of the social network that have formed a relationship with the user on the social network such as being a friend or follower) that have a strong relationship (e.g., a high relationship strength metric) to the user (e.g., a user contact that the user messages frequently on the social network service). If the context indication is associated with a particular user contact that has a strong relationship with the user, the context module 230 calculates a high significance score for that particular context indication.

In still other implementations, the context module 230 "seeds" particular notifications in order to gauge whether the user is interested in the particular notification. For instance, a particular context indication may be associated with a particular notification that the user has in the past not been interested in as determined based on the user dismissing or not being engaged with the notification. Despite this determination by the context module 230, the context module 230 may randomly or periodically determine that such a context indication is significant to test or gauge whether the user now has an interest in such notifications associated with such context indications.

In yet other implementations, the context module 230 employs collaborative filtering techniques to determine whether the user the context indication is significant. For instance, the context module 230 identifies similar members of the social network that are similar to the user (e.g., similar demographic information, similar account usage patterns). In these implementations, the context module 230 determines whether the context indication is significant with respect to the user based on whether similar context indications were significant with respect to similar members. In this way, the context module 230 determines the significance score for a particular context indication based on similar members.

At operation 820, the context module 230 compares the significance score to a threshold. The threshold can be predefined or dynamically determined. At operation 830, if the context module 230 determines that the significance score exceeds the threshold, the context indication is significant, and the method 400 may proceed to the operation 430. However, at operation 840, if the context module 230 determines that the significance score is below the threshold, the context indication is not significant and the method 400 may end. That is to say, no further operations of the method 400 may be performed if the context indication is not significant.

In some implementations, the context module 230 determines the threshold for the significance score based, in part, on a user status. In an embodiment, the context module 230 determines the user data based on various data from the device. For example, if the context module 230 determines the user is currently driving (e.g., as determine based on a velocity of a user device corresponding to the user), the context module 230 determines a higher threshold for the significance score to exceed (the reasoning being that the user is less able to respond to a notification while driving). In another example, the context module 230 receives a heart rate of the user from a heart rate sensor of a wearable device the user is wearing and determines that the user is sleeping. In this example, the context module 230 may determine a much higher threshold for the significance score so that only highly important notifications are presented to the user while the user status indicates the user is sleeping. In some embodiments, the context module 230 determines the status of the user by analyzing the sensor data in conjunction with other data. For example, the context module 230 may determine the user status based on calendar data in conjunction with a location of the user as determined by a GPS component of a mobile device of the user.

In further implementations, the context module 230 determines the threshold for the significance score based in part on a particular device of the user that the notification is to be presented on. For example, if the user device to present the notification to the user is a wearable computing device, the context module 230 may determine a higher threshold for the significance score to exceed (the reasoning being that notifications to some device, like wearable computing devices, may be more disruptive than other devices and therefore should have a higher notification threshold). In a specific example, the context module 230 may identify the type of device that is to present the notification to the user by analyzing device data, performing a lookup of the device (e.g., a lookup up on the third party server(s) 146 for a particular device identifier to determine the type of device to present the device notification), or a variety of other techniques. For instance, the context module 230 may identify the type of device that is to present the notification based on a device model identifier retrieved from the device.

Figure 9B:
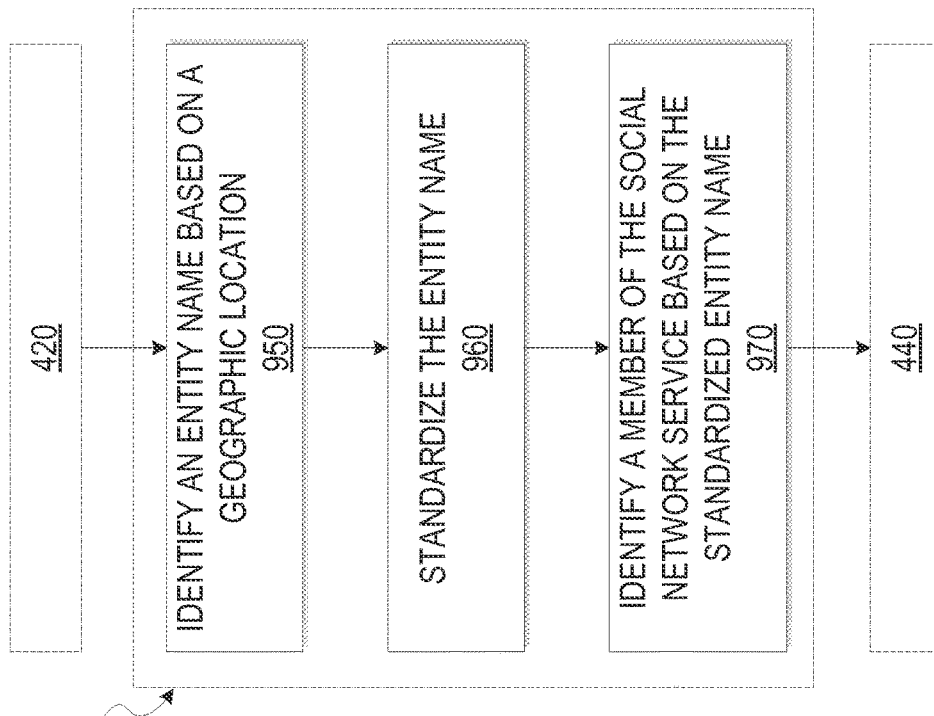
FIGS. 9A and 9B are flow diagrams illustrating further example operations for identifying an entity associated with a context indication, according to some example embodiments.
Figure 9A:
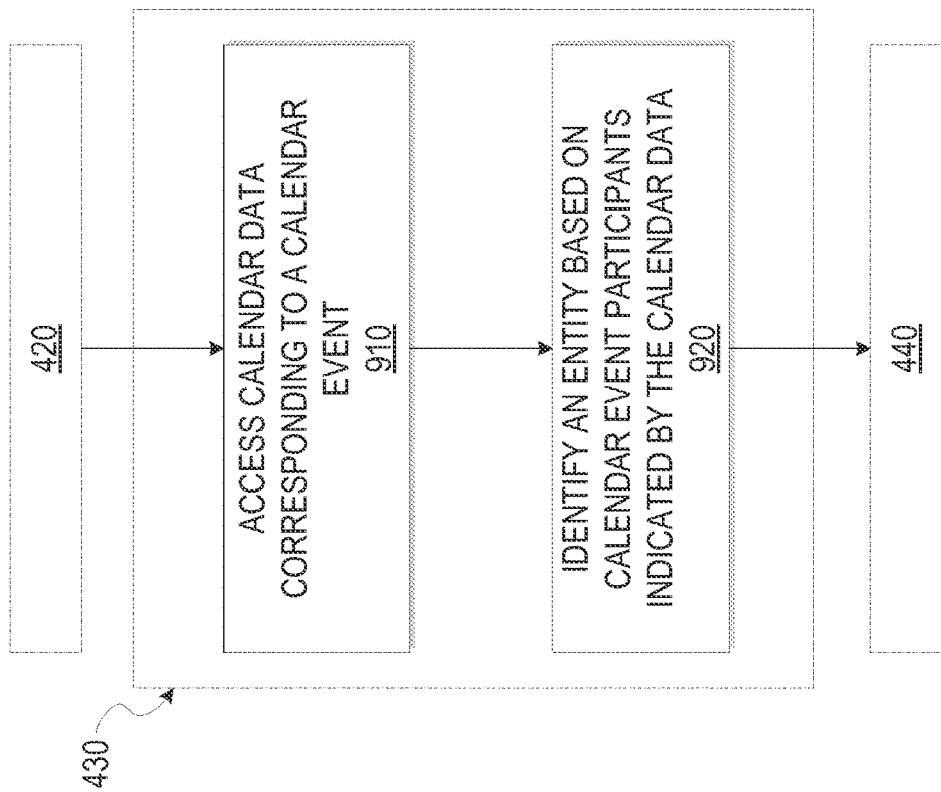

FIGS. 9A and 9B are flow diagrams illustrating further example operations of the method 400 for generating the notification. Subsequent to the operation 420, at the operation 430, the analysis module 240 identifies an entity associated with the significant context indication. In some implementations, the method 400 includes the additional operations shown in FIG. 9A. At operation 910, the data module 250 accesses calendar data corresponding to a calendar event. For example, if the significant context indication indicates a particular calendar event (e.g., the user added or modified a particular calendar event), the data module 250 accesses calendar data corresponding to the particular calendar event (e.g., via a lookup of the calendar event included in the calendar data).

At operation 920, the analysis module 240 identifies the entity based on calendar event participants indicated by the calendar data corresponding to the calendar event. For example, the calendar data indicates attendees or participants corresponding to the calendar event, and the analysis module 240 identifies the entity from among the calendar event participants. Subsequent to the operation 920, the method 400 may proceed to the operation 440.

The method 400 may include the additional operations shown in FIG. 9B. At operation 950, the analysis module 240 identifies an entity name based on the geographic location indicated by the significant context indication. For example, the significant context indication includes location data (e.g., longitude and latitude). In various implementations, the analysis module 240 performs a query or a lookup at a database or third party server (e.g., the third party servers 146) to identify an entity associated with the location.

At operation 960, the analysis module 240 standardizes the entity name, according to some embodiments. For example, the entity name identified by the analysis module 240 at the operation 950 may be non-standard (e.g., "LinkedIn HQ," LinkedIn Main Campus"). The analysis module 950 standardizes the entity name (e.g., "LinkedIn Corporate Headquarters") to allow for identifying a member of the social network service associated with the standardized name.

At operation 970, the analysis module 240 identifies a member of the social network service based on the standardized entity name. For instance, the analysis module 240 identifies a member identifier corresponding to the standardized entity name to be used for subsequent analysis (e.g., identifying a commonality between the user and the entity using the user member identifier and the entity identifier).

FIGS. 10A and 10B are flow diagrams illustrating further example operations of the method 400 for generating the notification. Subsequent to the operation 440, at the operation 450, the notification module 260 generates the notification content based, at least in part, on an analysis of the significant context indication and the member data. The method 400 may include the additional operations shown in FIG. 10A.

At operation 1010, the analysis module 240 identifies a relevant commonality between the user and the identified entity based on an analysis of the member data and the significant context indication, with the relevant commonality being relevant to the significant context indication. For example, the member data of the user and the identified entity may have various commonalities such as going to the same school, working at the same company, holding the same job title, living in the same city or region, and so on. In addition, a particular commonality may be relevant to the significant context indication. For example, if the significant context indication indicates that the user and the identified entity are both attending a sales conference and the analysis module 240 identifies a commonality such as both the user and the identified entity having been speakers at sales conferences in the past, the analysis module 240 further identifies the commonality as a relevant commonality since being a speaker or participating at a sales conference in the past is relevant to the significant context indication. In another example, the commonality may be contacts on the social network service that the user and the identified entity have in-common. The analysis module 240 identifies relevant contacts among the in-common contacts between the user and the identified entity based on the significant context indication (e.g., identify contacts with a finance background that are in-common to the user and the identified entity if the significant context indication is associated with a finance related meeting).

At operation 1020, the notification module 260 generates the notification content based on the relevant commonality. For example, the notification content comprises one or more of the relevant commonalities identified at the operation 1010.

The method 400 may include the additional operations shown in FIG. 10B. At operation 1050, the analysis module 240 identifies a pertinent piece of information based on an analysis of the member data and the significant context indication, with the pertinent piece of information being pertinent to the significant context indication. For example, if the significant context indication indicates that the user is within a radius of a particular entity and it is the particular entity's birthday, the analysis module 240 identifies the birthday of the entity as the pertinent piece of information. In another example, the analysis module 240 identifies when the user last met the identified entity. The last meeting time between the user and the identified entity may be the pertinent piece of information (e.g., useful to the user to refresh their memory in regards to the identified entity). In still another example, the identified entity is a particular business the user is visiting. In this example, the pertinent information is business information such as size of the business, stock price, contact members (e.g., friends, favorite users or other members of the social network service that formed a connection or relationship with the user on the social network service) of the user associated with the particular business (e.g., contact member that works at the particular business), in-common connections on the social network between the user and the particular business, current events and news associated with the company, and so forth.

At operation 1060, the notification module 260 generates the notification content based on the pertinent piece of information. For example, the notification content comprises one or more of the pertinent pieces of information identified at the operation 1050.

Example User Interfaces

Figure 11:
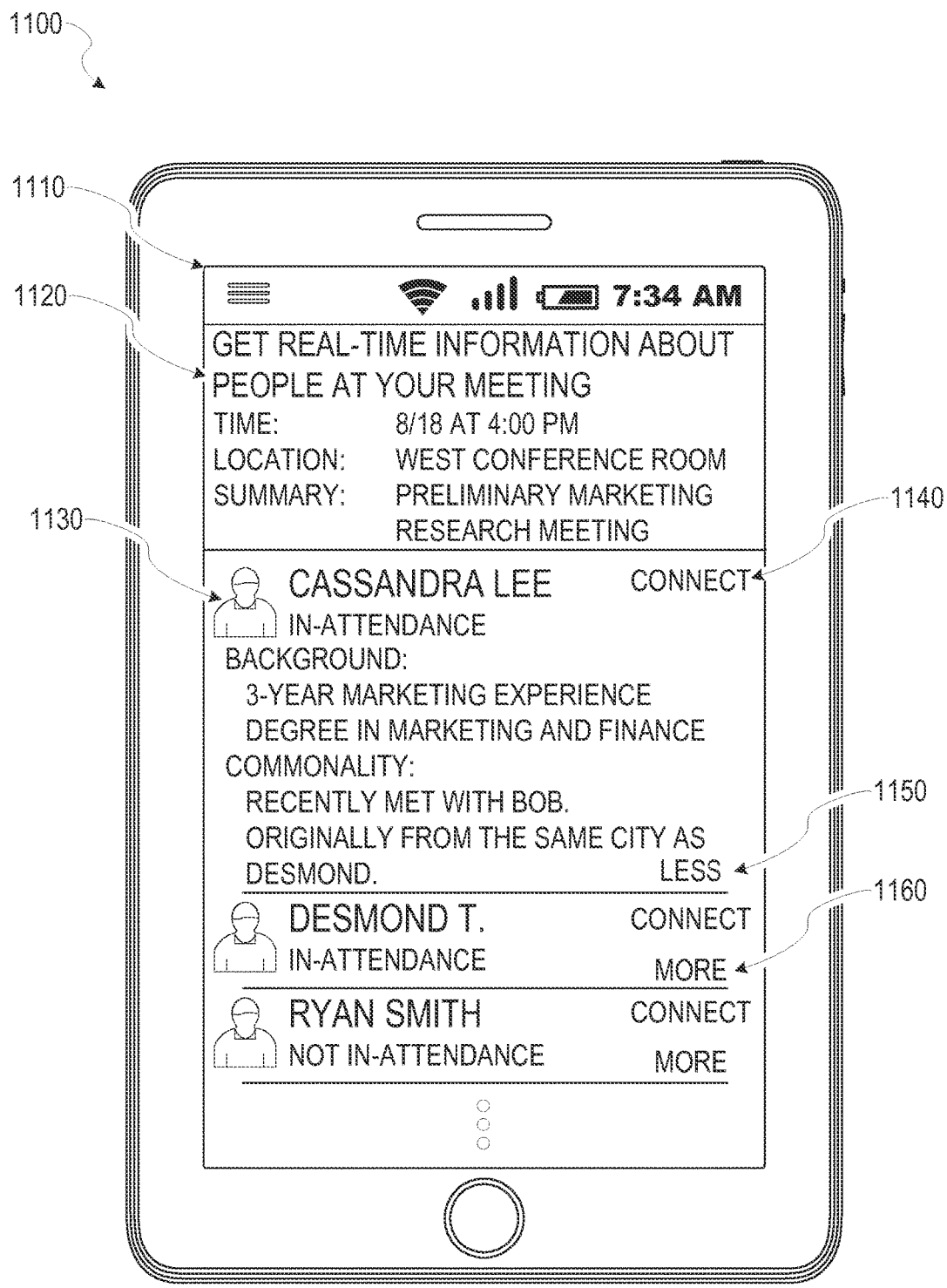
FIGS. 11-13 illustrate example user interfaces, according to some example embodiments.
Figure 12:
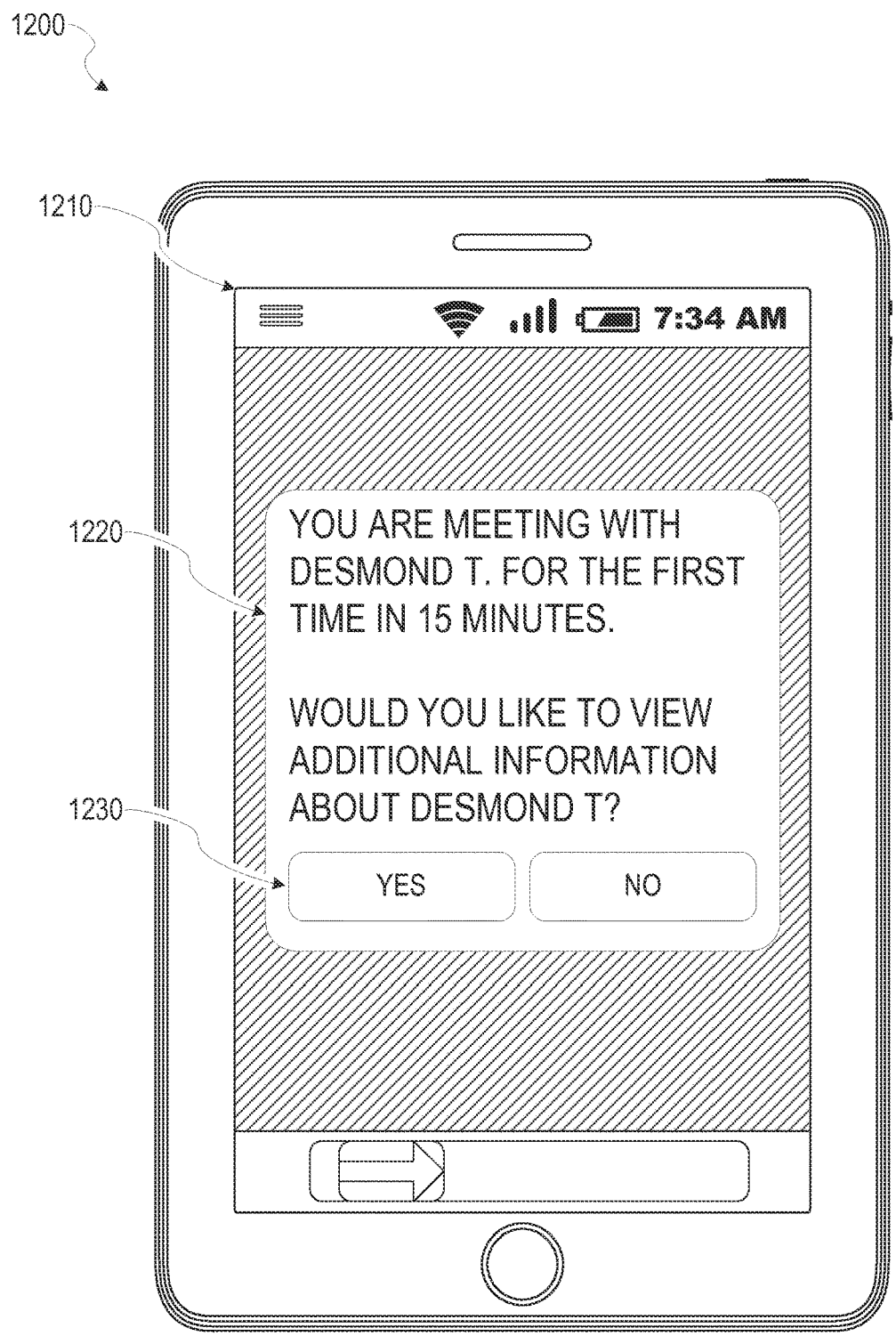
Figure 13:
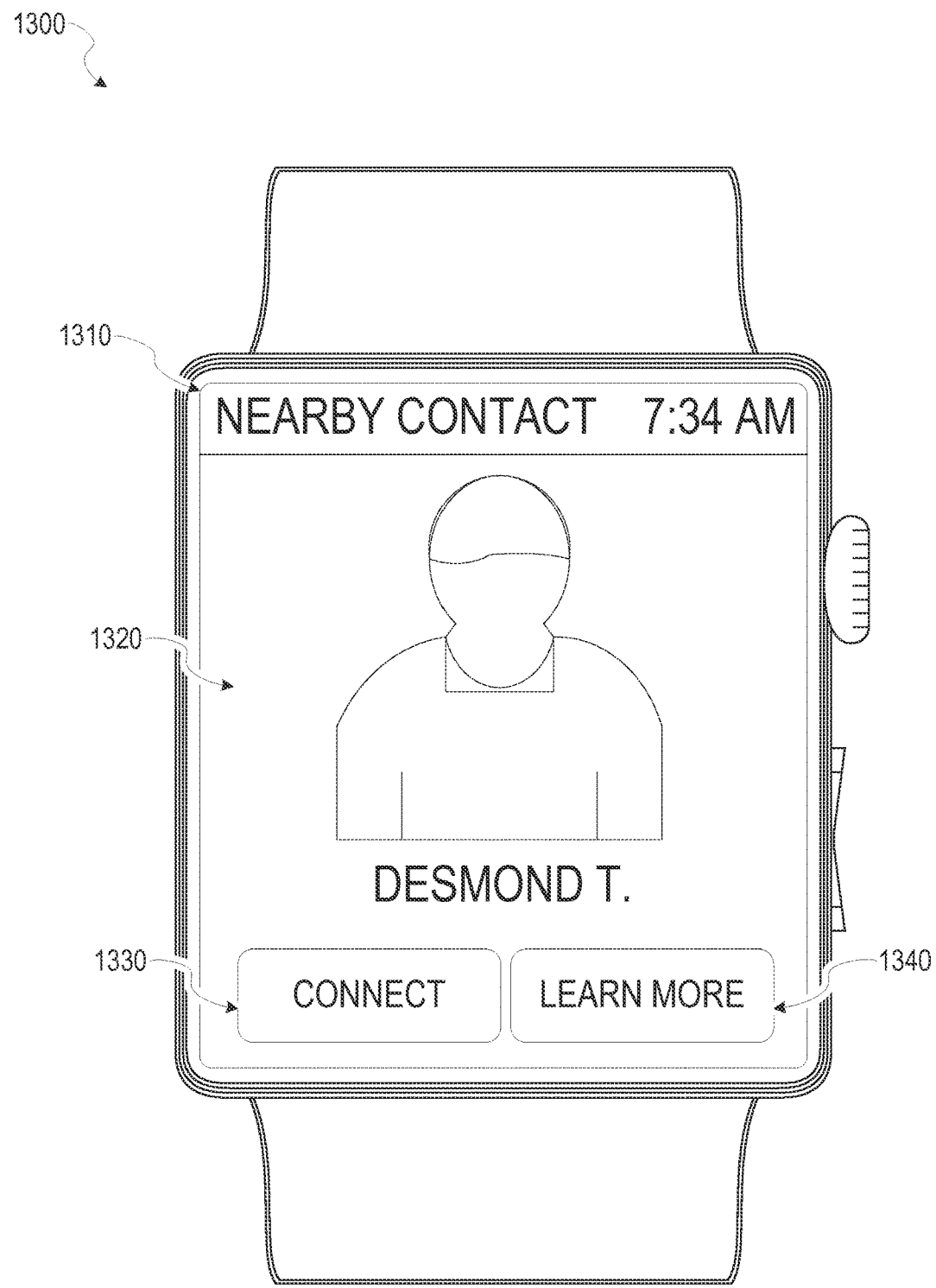

FIGS. 11-13 depict example user interfaces for interactively presenting information to the user. Although FIGS. 11-13 depict specific example user interfaces and user interface elements, these are merely non-limiting examples and many other alternate user interfaces and user interface elements can be generated by the presentation module 210 and presented to the user. It will be noted that alternate presentations of the displays of FIGS. 11-13 can include additional information, graphics, options, and so forth; other presentations include less information, or provide abridged information for easy use by the user.

FIG. 11 depicts an example device 1100 (e.g., a smart phone) displaying an example user interface 1110 to the user. As indicated by user interface element 1120, the user interface 1110 provides the user with pertinent or relevant information associated with an upcoming meeting. The user interface 1110 may be the notification or a user interface subsequent to the notification (e.g., the user selecting an option to provide additional information regarding the notification). As described above, the notification module 260 may have scheduled the pre-event task to be executed at the notification time that is prior to the meeting (e.g., 15 minutes before the meeting) indicated by the calendar data of the user. When the notification module 260 performs the pre-event task, the analysis module 240 identifies entities based on calendar event participants indicated by the calendar data (e.g., the attendees of the scheduled meeting). In this example, the user interface elements 1130 provide information associated with a particular attendee of the scheduled meeting. For instance, relevant information such as the entity's background, or a commonality between the entity and the user (e.g., something interesting that may be the basis for starting a conversation). In some example embodiments, the user may connect with a particular entity associated with the notification, for example, by activating user interface element 1140. In further example embodiments, the user may modify, navigate, or otherwise interact with the user interface 1110 using user interface elements such as 1150 and 1160. In this example, activating the user interface element 1160 provides additional information corresponding to a particular entity and activating the user interface element 1150 provides less information corresponding to a particular entity. Many alternate interactive presentations of the user interface 1110 include additional information, graphics, media, options, and so on while other presentations include less information.

FIG. 12 depicts an example device 1200 (e.g., smart phone) displaying an example user interface 1210 that includes a notification 1220, according to some example embodiments. In various example embodiments, the presentation module 210 causes presentation of the notification 1220 to the user. For instance, the presentation module 210 communicates, to the device 1200, instructions to present the notification 1220. In some instances, the instructions include notification content, generated by the presentation module 210, such as a message (e.g., pertinent information) to be presented to the user. In example embodiments, the notification 1220 comprises a text message, such as SMS messages, MMS, EMS, and so forth. In other example embodiments, the notification 1220 comprises a push notification or another similar type of notification. In further example embodiments, the notification 1220 comprises interactive user interface elements such as user interface elements 1230. In these example embodiments, the user interface elements 1230 provide the user an option to make a selection (e.g., through an SMS system, mobile application).

FIG. 13 depicts an example device 1300 (e.g., a smart watch) displaying an example user interface 1310 that includes a notification 1320, according to some example embodiments. For example, the notification may indicate that the user is within the vicinity of a particular entity. In this example, the user may connect with the entity on the social network service by activating the user interface element 1330 or learn more about the particular entity by activating the user interface element 1340.

As described above, in some example embodiments, the notification module 260 generates the notification content based on the user device that the notification may be presented on. For instance, if the user device is a wearable device, an abbreviated or otherwise shortened or abridged notification content may be generated to accommodate the smaller display of the wearable device. In a specific example, if a particular notification is destined for a smart watch, the particular notification may omit non-pertinent information. That is to say, the notification module 260 generates the notification to include pertinent notification content to reduce the user interface size for the notification (e.g., providing a contact's name and image as opposed to providing name, image, and background information corresponding to the contact).

In further example embodiments, the notification module 260 determines an available functionality of the user device and generate the notification based the available functionality. For example, if the user device is a wearable device, such as a smart watch, that includes haptic output, the notification module 260 generates the notification content to include haptic output (e.g., a particular pattern of vibration to alert the user of the notification). In still further example embodiments, the notification module 260 determines a device status for the user device and direct the notification based on the device status. For instance, if the user is wearing a smart watch and is carrying a smart phone, the notification module 260 determines that the smart phone is inactive and direct the notification to the smart watch.

Example Device Communicative Coupling

Figure 14:
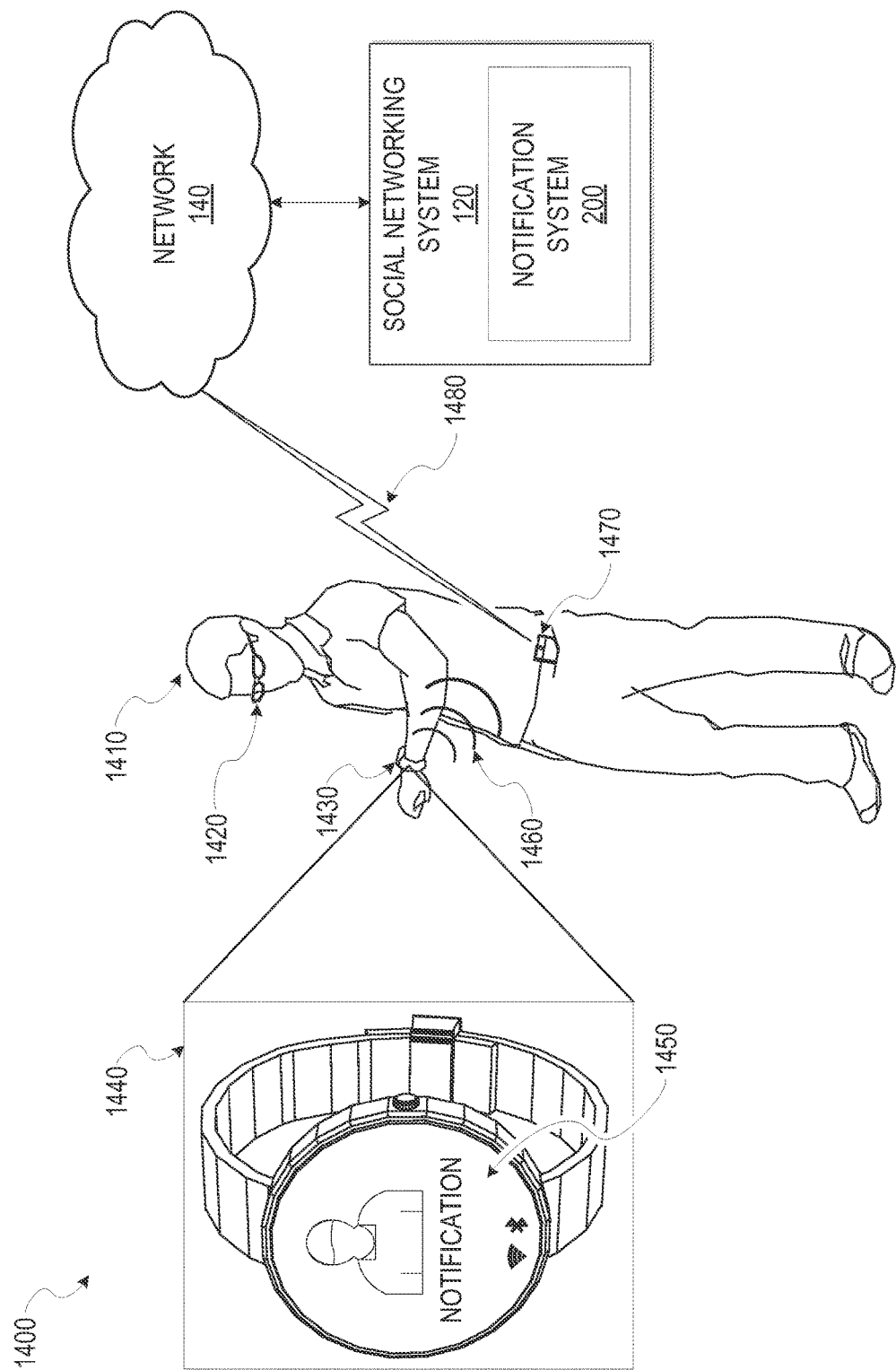
FIG. 14 illustrates an example diagram of communicative coupling between various devices and the notification system, according to some example embodiments.

FIG. 14 illustrates an example diagram 1400 of communicative coupling between various devices and the notification system, according to some example embodiments. In the example diagram 1400, user 1410 may be using wearable computing devices such as wearable device 1420 (e.g., GOOGLE GLASS®) or wearable device 1430 (e.g., a smart watch). View 1440 is an enlarged view that depicts an example of the wearable device 1430 that includes a user interface 1450. In this example, the wearable device 1430 is communicatively coupled to user device 1470 (e.g., a smart phone) via communicative coupling 1460. In various implementations, the user device 1470 is communicatively coupled, via communicative coupling 1480, to the network 140, which is in turn communicatively coupled to the social networking system 120 including the notification system 200 (discussed above in connection with FIGS. 2 and 3).

In some implementations, the wearable devices 1420 and 1430 are standalone wearable computing devices that are communicatively coupled to the network 140 and can exchange information with the social networking system 120 without an intermediate device. For instance, the wearable device in these implementations includes a cellular communication component or another communication component operable to provide connectivity for the wearable device 1430 without being communicatively coupled to an intermediate device.

In other implementations, the wearable devices 1420 and 1430 are communicatively coupled to an intermediate device, such as the user device 1470, that is operable to communicate with the network 140. For instance, in these implementations, the wearable device 1430 is communicatively coupled to the user device 1470 via a BLUETOOTH®, WI-FI®, or another communication modality. In these instances, communication between the wearable device 1430 and the network 140 is via the user device 1470.

In a specific example, the notification system 200 causes presentation of the notification to the user by transmitting the notification content and instructions to present the notification to the user device 1470 via the network 140 and the commutative coupling 1480. The user device 1470 can then transmit the notification to the wearable device 1430 via the communicative coupling 1460 (e.g., a BLUETOOTH® connection between the wearable device 1430 and the user device 1470). Similarly, the wearable device 1430 can transmit user input or other data to the notification system 200 by transmitting the information to the user device 1470 via the communicative coupling 1460. The user device 1470 can then transmit the information to the notification system via the network 140 and the communicative coupling 1480. In this way, the wearable device 1430 is communicatively coupled to the notification system 200 without having a direct communicative coupling to the network 140.

In various implementations, the wearable devices 1420 and 1430 receive various data from the user device 1470. For example, sensor data or other data received or detected at the user device 1470 from various input/output (I/O) components that are not available on the wearable devices 1420 and 1430 is communicated to the wearable devices 1420 and 1430 from the user device 1470. For instance, the wearable device 1430 may not include a GPS component to reduce power consumption, but can access, receive, retrieve, or otherwise obtain location data from a GPS component included in the user device 1470. A variety of other data can be exchanged between the wearable device 1430 and the user device 1470 including sensor data, user input data, application data (e.g., user preference), resource data (e.g., stored files), and so on.

Modules, Components, and Logic

Certain embodiments are described herein as including logic or a number of components, modules, or mechanisms. Modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules are located in a single geographic location (e.g., within a home environment, an office environment, or a server farm). In other example embodiments, the processors or processor-implemented modules are distributed across a number of geographic locations.

Software Architecture

Figure 15:
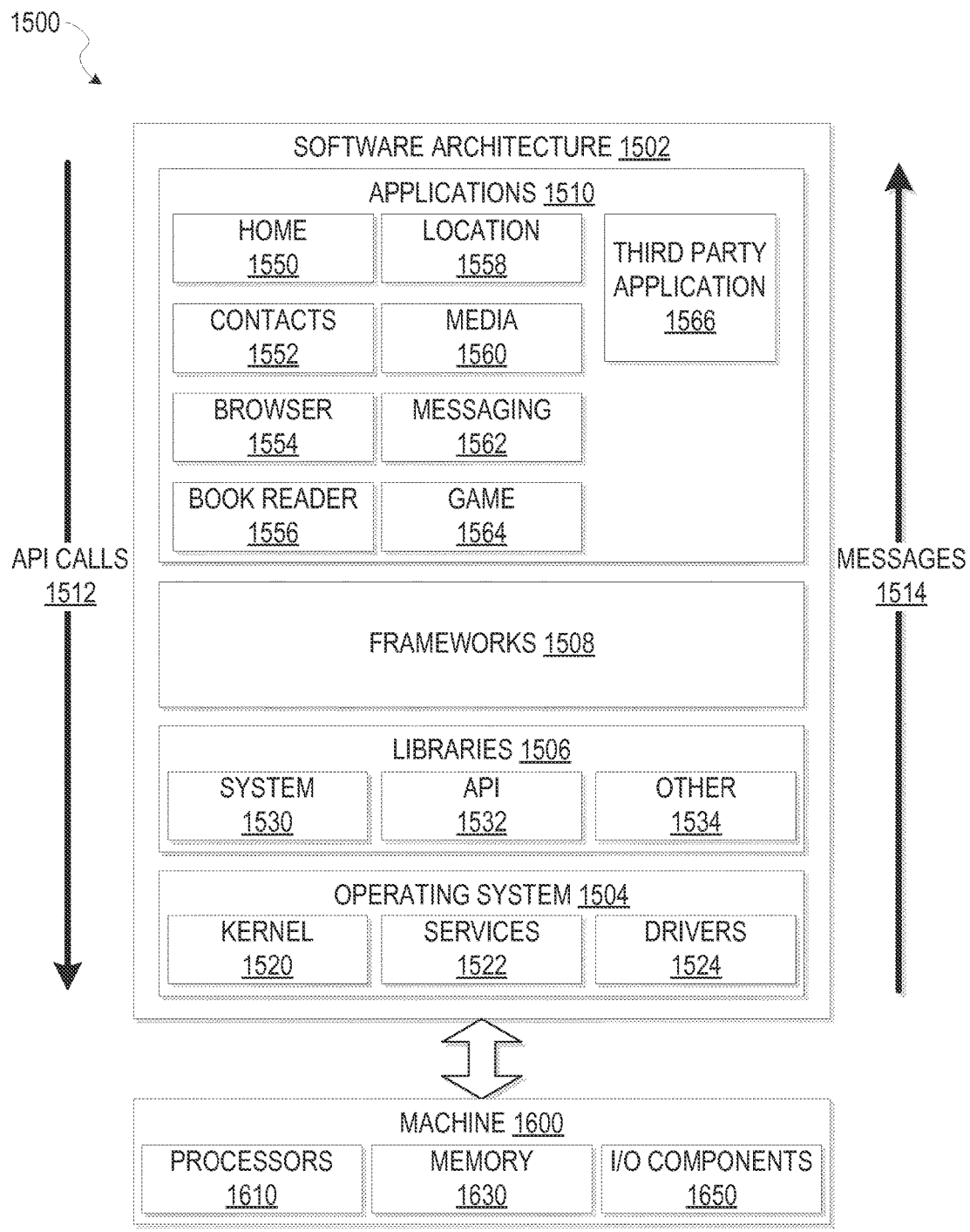
FIG. 15 is a block diagram illustrating an example of a software architecture that may be installed on a machine, according to some example embodiments.

FIG. 15 is a block diagram 1500 illustrating an architecture of software 1502, which can be installed on any one or more of the devices described above. FIG. 15 is merely a non-limiting example of a software architecture, and it will be appreciated that many other architectures can be implemented to facilitate the functionality described herein. In various embodiments, the software 1502 is implemented by hardware such as machine a 1600 of FIG. 16 that includes processors 1610, memory 1630, and I/O components 1650. In this example architecture, the software 1502 can be conceptualized as a stack of layers where each layer may provide a particular functionality. For example, the software 1502 includes layers such as an operating system 1504, libraries 1506, frameworks 1508, and applications 1510. Operationally, the applications 1510 invoke application programming interface (API) calls 1512 through the software stack and receive messages 1514 in response to the API calls 1512, consistent with some embodiments.

In various implementations, the operating system 1504 manages hardware resources and provides common services. The operating system 1504 includes, for example, a kernel 1520, services 1522, and drivers 1524. The kernel 1520 acts as an abstraction layer between the hardware and the other software layers consistent with some embodiments. For example, the kernel 1520 provides memory management, processor management (e.g., scheduling), component management, networking, and security settings, among other functionality. The services 1522 can provide other common services for the other software layers. The drivers 1524 are responsible for controlling or interfacing with the underlying hardware, according to some embodiments. For instance, the drivers 1524 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 1506 provide a low-level common infrastructure utilized by the applications 1510. The libraries 1506 can include system libraries 1530 (e.g., C standard library) that can provide functions such as memory allocation functions, string manipulation functions, mathematic functions, and the like. In addition, the libraries 1506 can include API libraries 1532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1506 can also include a wide variety of other libraries 1534 to provide many other APIs to the applications 1510.

The frameworks 1508 provide a high-level common infrastructure that can be utilized by the applications 1510, according to some embodiments. For example, the frameworks 1508 provide various graphic user interface (GUI) functions, high-level resource management, high-level location services, and so forth. The frameworks 1508 can provide a broad spectrum of other APIs that can be utilized by the applications 1510, some of which may be specific to a particular operating system or platform.

In an example embodiment, the applications 1510 include a home application 1550, a contacts application 1552, a browser application 1554, a book reader application 1556, a location application 1558, a media application 1560, a messaging application 1562, a game application 1564, and a broad assortment of other applications such as a third party application 1566. According to some embodiments, the applications 1510 are programs that execute functions defined in the programs. Various programming languages can be employed to create one or more of the applications 1510, structured in a variety of manners, such as object-oriented programming languages (e.g., Objective-C, Java, or C++) or procedural programming languages (e.g., C or assembly language). In a specific example, the third party application 1566 (e.g., an application developed using the ANDROID™ or IOS™ software development kit (SDK) by an entity other than the vendor of the particular platform) may be mobile software running on a mobile operating system such as IOS™, ANDROID™, WINDOWS® PHONE, or another mobile operating systems. In this example, the third party application 1566 can invoke the API calls 1512 provided by the operating system 1504 to facilitate functionality described herein.

Example Machine Architecture and Machine-Readable Medium

Figure 16:
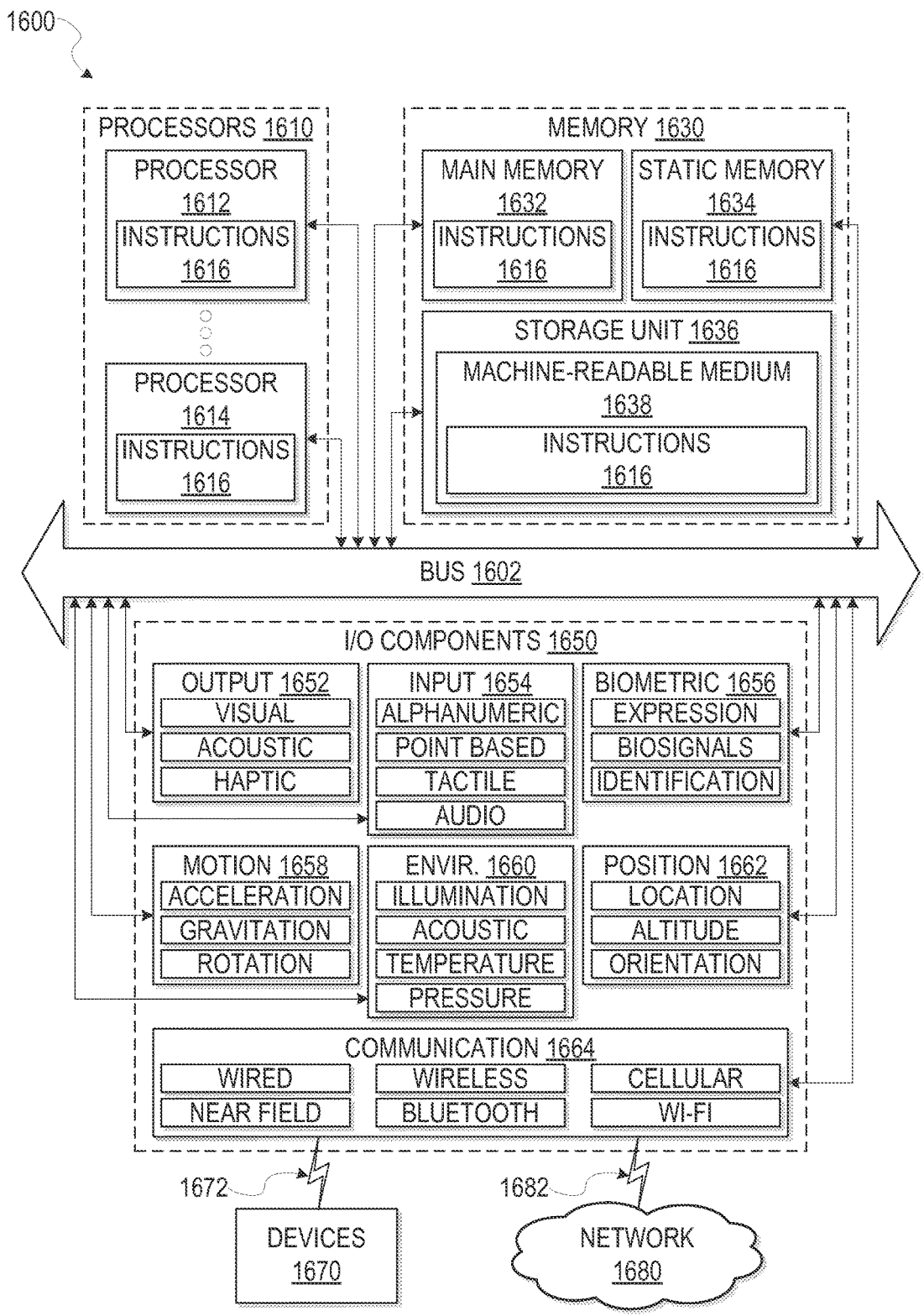
FIG. 16 illustrates a diagrammatic representation of a machine in the form of a computer system within which a set of instructions may be executed for causing the machine to perform any one or more of the methodologies discussed herein, according to an example embodiment.

FIG. 16 is a block diagram illustrating components of a machine 1600, according to some embodiments, able to read instructions from a machine-readable medium (e.g., a machine-readable storage medium) and perform any one or more of the methodologies discussed herein. Specifically, FIG. 16 shows a diagrammatic representation of the machine 1600 in the example form of a computer system, within which instructions 1616 (e.g., software, a program, an application, an applet, an app, or other executable code) for causing the machine 1600 to perform any one or more of the methodologies discussed herein can be executed. In alternative embodiments, the machine 1600 operates as a standalone device or can be coupled (e.g., networked) to other machines. In a networked deployment, the machine 1600 may operate in the capacity of a server machine or a client machine in a server-client network environment, or as a peer machine in a peer-to-peer (or distributed) network environment. The machine 1600 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1616, sequentially or otherwise, that specify actions to be taken by the machine 1600. Further, while only a single machine 1600 is illustrated, the term "machine" shall also be taken to include a collection of machines 1600 that individually or jointly execute the instructions 1616 to perform any one or more of the methodologies discussed herein.

In various embodiments, the machine 1600 comprises processors 1610, memory 1630, and I/O components 1650, which can be configured to communicate with each other via a bus 1602. In an example embodiment, the processors 1610 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) includes, for example, a processor 1612 and a processor 1614 that may execute the instructions 1616. The term "processor" is intended to include multi-core processors that may comprise two or more independent processors (also referred to as "cores") that can execute instructions contemporaneously. Although FIG. 16 shows multiple processors, the machine 1600 may include a single processor with a single core, a single processor with multiple cores (e.g., a multi-core processor), multiple processors with a single core, multiple processors with multiples cores, or any combination thereof.

The memory 1630 comprises a main memory 1632, a static memory 1634, and a storage unit 1636 accessible to the processors 1610 via the bus 1602, according to some embodiments. The storage unit 1636 can include a machine-readable medium 1638 on which are stored the instructions 1616 embodying any one or more of the methodologies or functions described herein. The instructions 1616 can also reside, completely or at least partially, within the main memory 1632, within the static memory 1634, within at least one of the processors 1610 (e.g., within the processor's cache memory), or any suitable combination thereof, during execution thereof by the machine 1600. Accordingly, in various embodiments, the main memory 1632, the static memory 1634, and the processors 1610 are considered machine-readable media 1638.

As used herein, the term "memory" refers to a machine-readable medium 1638 able to store data temporarily or permanently and may be taken to include, but not be limited to, random-access memory (RAM), read-only memory (ROM), buffer memory, flash memory, and cache memory. While the machine-readable medium 1638 is shown in an example embodiment to be a single medium, the term "machine-readable medium" should be taken to include a single medium or multiple media (e.g., a centralized or distributed database, or associated caches and servers) able to store the instructions 1616. The term "machine-readable medium" shall also be taken to include any medium, or combination of multiple media, that is capable of storing instructions (e.g., instructions 1616) for execution by a machine (e.g., machine 1600), such that the instructions, when executed by one or more processors of the machine 1600 (e.g., processors 1610), cause the machine 1600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1650 include a wide variety of components to receive input, provide output, produce output, transmit information, exchange information, capture measurements, and so on. In general, it will be appreciated that the I/O components 1650 can include many other components that are not shown in FIG. 16. The I/O components 1650 are grouped according to functionality merely for simplifying the following discussion, and the grouping is in no way limiting. In various example embodiments, the I/O components 1650 include output components 1652 and input components 1654. The output components 1652 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1654 include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1650 include biometric components 1656, motion components 1658, environmental components 1660, or position components 1662, among a wide array of other components. For example, the biometric components 1656 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1658 include acceleration sensor components (e.g., accelerometer), gravitation sensor components, rotation sensor components (e.g., gyroscope), and so forth. The environmental components 1660 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1662 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1650 may include communication components 1664 operable to couple the machine 1600 to a network 1680 or devices 1670 via a coupling 1682 and a coupling 1672, respectively. For example, the communication components 1664 include a network interface component or another suitable device to interface with the network 1680. In further examples, communication components 1664 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1670 may be another machine or any of a wide variety of peripheral devices (e.g., a peripheral device coupled via a Universal Serial Bus (USB)).

Moreover, in some embodiments, the communication components 1664 detect identifiers or include components operable to detect identifiers. For example, the communication components 1664 include Radio Frequency Identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1664, such as location via Internet Protocol (IP) geo-location, location via WI-FI® signal triangulation, location via detecting an BLUETOOTH® or NFC beacon signal that may indicate a particular location, and so forth.

Transmission Medium

In various example embodiments, one or more portions of the network 1680 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1680 or a portion of the network 1680 may include a wireless or cellular network, and the coupling 1682 may be a Code Division Multiple Access (CDMA) connection, a Global System for Mobile communications (GSM) connection, or another type of cellular or wireless coupling. In this example, the coupling 1682 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks. Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1616 are transmitted or received over the network 1680 using a transmission medium via a network interface device (e.g., a network interface component included in the communication components 1664) and utilizing any one of a number of well-known transfer protocols (e.g., Hypertext Transfer Protocol (HTTP)). Similarly, in other example embodiments, the instructions 1616 are transmitted or received using a transmission medium via the coupling 1672 (e.g., a peer-to-peer coupling) to the devices 1670. The term "transmission medium" shall be taken to include any intangible medium that is capable of storing, encoding, or carrying the instructions 1616 for execution by the machine 1600, and includes digital or analog communications signals or other intangible media to facilitate communication of such software.

Furthermore, the machine-readable medium 1638 is non-transitory (in other words, not having any transitory signals) in that it does not embody a propagating signal. However, labeling the machine-readable medium 1638 "non-transitory" should not be construed to mean that the medium is incapable of movement; the medium should be considered as being transportable from one physical location to another. Additionally, since the machine-readable medium 1638 is tangible, the medium may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   receiving a context indication corresponding to a first member of a social network service, the context indication including at least information identifying a current location of the first member and calendar data of the first member, the calendar data identifying a second member of the social network service and indicating the first member is scheduled to meet with the second member;
   calculating a significance score corresponding to the context indication, the significance score calculated in part based on historical location information of the first member indicating that the first member is at the current location for the first time and, based on the calendar data, the first member is scheduled to meet with the second member;
   determining that the context indication is a significant context indication based on the significance score exceeding a threshold value; and
   responsive to determining that the context indication is a significant context indication:
   identifying an organization corresponding with a profile hosted by the social network service and having a location proximate to the current location of the first member as indicated by the significant context indication;
   accessing profile data of the organization and profile data of the first member, the profile data of the organization including one or more of: a stock price of the organization, number of employees for the organization, other members of the social network service employed by the organization, and news associated with the organization;
   generating, using at least one hardware processor of a machine, notification content based, at least in part, on an analysis of the significant context indication, the profile data of the organization, the profile data of the first member, and profile data of the second member; and
   causing presentation at a client device of the first member of a notification that includes the notification content.

2. The method of claim 1, further comprising:
   determining notification parameters based, at least in part, on the significant context indication and the profile data of the first member; and
   causing presentation of the notification according to the notification parameters.

3. The method of claim 2, further comprising:
   wherein the notification parameters include a temporal parameter; and
   causing presentation of the notification to the first member at a notification time based on the temporal parameter.

4. The method of claim 1, further comprising:
   identifying a pertinent piece of information based on an analysis of the profile data of the first member and the significant context indication, the pertinent piece of information being pertinent to the significant context indication; and
   generating the notification content based, at least in part, on the pertinent piece of information.

5. The method of claim 1, further comprising:
   identifying a relevant commonality between the first member and the organization based on an analysis of the member profile data of the first member and the significant context indication, the relevant commonality being relevant to the significant context indication; and generating the notification content based, at least in part, on the relevant commonality.

6. The method of claim 5, wherein the relevant commonality is identified based, at least in part, on a context of the organization.

7. The method of claim 1, wherein the context indication includes at least one of proximity data, calendar data, location data, and temporal data.

8. A machine-readable medium having no transitory signals and storing instructions that, when executed by at least one processor of a machine, cause the machine to perform operations comprising:

receiving a context indication corresponding to a first member of a social network service, the context indication including at least one calendar event and information indicating a current location of the first member, the calendar data identifying a second member of the social network service and indicating the first member is scheduled to meet with the second member;

calculating a significance score corresponding to the context indication, the significance score calculated in part based on historical location information of the first member indicating that the first member is at the current location for the first time and, based on the calendar data, the first member is scheduled to meet with the second member;

determining that the context indication is a significant context indication based on the significance score exceeding a threshold value; and responsive to determining that the context indication is a significant context indication:

identifying an organization corresponding with a profile hosted by the social network service and having a location proximate to the current location of the first member as indicated by the significant context indication;

accessing profile data of the organization and profile data of the first member, the profile data of the organization including one or more of: a stock price of the organization, number of employees for the organization, other members of the social network service employed by the organization, and news associated with the organization;

generating notification content based, at least in part, on an analysis of the significant context indication, the profile data of the organization, the profile data of the first member, and profile data of the second member; and causing presentation at a client device of the first member of a notification that includes the notification content.

9. The machine-readable medium of claim 8, wherein the operations further comprise:

determining notification parameters based, at least in part, on the significant context indication and the profile data of the first member; and causing presentation of the notification according to the notification parameters.

10. The machine-readable medium of claim 8, wherein the operations further comprise:

wherein the notification parameters include a temporal parameter; and causing presentation of the notification to the first member at a notification time based on the temporal parameter.

11. The machine-readable medium of claim 8, wherein the operations further comprise:

identifying a pertinent piece of information based on an analysis of the profile data of the first member and the significant context indication, the pertinent piece of information being pertinent to the significant context indication; and generating the notification content based, at least in part, on the pertinent piece of information.

12. The machine-readable medium of claim 8, wherein the operations further comprise:

identifying a relevant commonality between the first member and the identified entity based on an analysis of the member profile data of the first member and the significant context indication, the relevant commonality being relevant to the significant context indication; and generating the notification content based, at least in part, on the relevant commonality.

13. The machine-readable medium of claim 12, wherein the relevant commonality is identified based, at least in part, on a context of the identified entity.

* * * * *